US010379407B2

(12) United States Patent
Jang et al.

(10) Patent No.: US 10,379,407 B2
(45) Date of Patent: Aug. 13, 2019

(54) LIQUID CRYSTAL DISPLAY HAVING ORIENTED PIXEL ELEMENTS

(71) Applicant: Samsung Display Co., Ltd, Yongin-si, Gyeonggi-do (KR)

(72) Inventors: Sang Hee Jang, Bucheon-si (KR); Hyun Sup Lee, Hwaseong-si (KR); Jung Hun Noh, Yongin-si (KR); Keun Kyu Song, Seongnam-si (KR); Byung Seok Choi, Seoul (KR)

(73) Assignee: Samsung Display Co., Ltd. (KR)

( * ) Notice: Subject to any disclaimer, the term of this patent is extended or adjusted under 35 U.S.C. 154(b) by 142 days.

(21) Appl. No.: 15/271,981

(22) Filed: Sep. 21, 2016

(65) Prior Publication Data
US 2017/0108746 A1 Apr. 20, 2017

(30) Foreign Application Priority Data

Oct. 15, 2015 (KR) .................. 10-2015-0143874

(51) Int. Cl.
*G02F 1/1343* (2006.01)
*G02F 1/1362* (2006.01)
*G02F 1/1337* (2006.01)

(52) U.S. Cl.
CPC .. *G02F 1/134309* (2013.01); *G02F 1/133707* (2013.01); *G02F 1/136286* (2013.01); *G02F 2201/123* (2013.01); *G02F 2201/40* (2013.01); *G02F 2201/52* (2013.01)

(58) Field of Classification Search
CPC .................................................... G02F 1/1343
See application file for complete search history.

(56) References Cited

U.S. PATENT DOCUMENTS

| 8,531,408 B2 | 9/2013 | Xu et al. | |
|---|---|---|---|
| 2004/0227890 A1* | 11/2004 | Chung | G02F 1/134363 349/141 |
| 2004/0263748 A1* | 12/2004 | Park | G02F 1/134363 349/141 |
| 2006/0262262 A1* | 11/2006 | Kim | G02F 1/134309 349/139 |
| 2008/0079678 A1* | 4/2008 | Cho | G09G 3/3648 345/88 |
| 2010/0014039 A1* | 1/2010 | Kim | G02F 1/1393 349/139 |

(Continued)

FOREIGN PATENT DOCUMENTS

| KR | 10-2010-0000721 A | 1/2010 |
|---|---|---|
| KR | 10-2014-0005717 A | 1/2014 |
| WO | 2010-093937 A1 | 8/2010 |

*Primary Examiner* — Sang V Nguyen
(74) *Attorney, Agent, or Firm* — Innovation Counsel LLP

(57) ABSTRACT

A liquid crystal display is provided. A liquid crystal display comprising: an insulating substrate, a plurality of pixels disposed on the insulating substrate, and a display area in which the pixels are arranged in rows and columns, wherein four pixels arranged successively in a row direction form a domain pattern, and the domain pattern is repeated in the row direction and a column direction in the display area, wherein each pixel in first and second rows of the domain pattern has a first domain orientation, and each pixel in third and fourth rows of the domain pattern has a second domain orientation that is different from the first domain orientation.

13 Claims, 19 Drawing Sheets

(56) References Cited

U.S. PATENT DOCUMENTS

| | | | |
|---|---|---|---|
| 2010/0207862 A1* | 8/2010 | Xu | G02F 1/134336 345/90 |
| 2011/0221727 A1* | 9/2011 | Kim | G09G 3/3614 345/209 |
| 2012/0127148 A1* | 5/2012 | Lee | G02F 1/134363 345/212 |
| 2013/0235315 A1* | 9/2013 | Ito | G02F 1/133784 349/126 |
| 2014/0211143 A1* | 7/2014 | Yuan | G02F 1/133707 349/143 |
| 2015/0036092 A1* | 2/2015 | Miyake | G02F 1/133753 349/144 |
| 2015/0116625 A1* | 4/2015 | Hwang | G02F 1/136209 349/57 |
| 2015/0309360 A1* | 10/2015 | Wang | G09G 3/3607 345/694 |
| 2016/0161805 A1* | 6/2016 | Park | G02F 1/133753 349/143 |
| 2016/0306237 A1* | 10/2016 | Okita | G02F 1/134309 |
| 2017/0371216 A1* | 12/2017 | Matsuda | G09G 3/3655 |

* cited by examiner

LIQUID CRYSTAL DISPLAY HAVING ORIENTED PIXEL ELEMENTS

This application claims priority to Korean Patent Application No. 10-2015-0143874 filed on Oct. 15, 2015 in the Korean Intellectual Property Office, the disclosure of which is incorporated herein by reference in its entirety.

BACKGROUND OF THE INVENTION

1. Field of the Invention

Embodiments of the present invention relate generally to liquid crystal displays. More specifically, embodiments of the present invention relate to liquid crystal displays with oriented pixel elements.

2. Description of the Related Art

Liquid crystal displays (LCDs) are one of the most widely used types of flat panel displays. Generally, an LCD includes field generating electrodes and a liquid crystal layer interposed between the field generating electrodes.

In an LCD, voltages are applied to the field generating electrodes to generate an electric field in a liquid crystal layer. Accordingly, the alignment direction of liquid crystal molecules of the liquid crystal layer is determined, and polarization of incident light is controlled. As a result, a desired image is displayed on the LCD.

One of these field generating electrodes is a pixel electrode typically having a certain pattern. The visibility, transmittance, etc. of the LCD may be greatly affected by the design or disposition of the pixel electrode.

In particular, there has been a growing demand for high-resolution LCDs. However, as the resolution of LCDs increases, the area occupied by one pixel is reduced. Therefore, it is required to develop a technology or design that can improve the visibility and transmittance of an LCD even under the above condition.

SUMMARY OF THE INVENTION

Aspects of the present invention provide a liquid crystal display (LCD) having improved transmittance and visibility.

However, aspects of the present invention are not restricted to the ones set forth herein. The above and other aspects of the present invention will become more apparent to one of ordinary skill in the art to which the present invention pertains by referencing the detailed description of the present invention given below.

According to an aspect of the present invention, there is provided a liquid crystal display. The liquid crystal display comprises: an insulating substrate, a plurality of pixels disposed on the insulating substrate, and a display area in which the pixels are arranged in rows and columns, wherein four pixels arranged successively in a row direction form a domain pattern, and the domain pattern is repeated in the row direction and a column direction in the display area, wherein each pixel in first and second rows of the domain pattern has a first domain orientation, and each pixel in third and fourth rows of the domain pattern has a second domain orientation that is different from the first domain orientation.

According to another aspect of the present invention, there is provided a liquid crystal display. The liquid crystal display comprises: an insulating substrate, a plurality of pixels disposed on the insulating substrate, a display area in which the pixels are arranged in rows and columns, wherein six pixels arranged successively in a row direction form a domain pattern, and the domain pattern is repeated in the row direction and a column direction in the display area, wherein each pixel in first, second and third rows of the domain pattern has a first domain orientation, and each pixel in fourth, fifth and sixth rows of the domain pattern has a second domain orientation that is different from the first domain orientation.

According to another aspect of the present invention, there is provided a liquid crystal display. The liquid crystal display comprises: an insulating substrate, a plurality of pixels disposed on the insulating substrate, a display area in which the pixels are arranged in rows and columns, wherein four pixels arranged successively in a row direction form a domain pattern, and the domain pattern is repeated in the row direction and a column direction in the display area, wherein a pixel in a first row of the domain pattern has a first domain orientation, a pixel in a second row of the domain pattern has a second domain orientation, a pixel in a third row of the domain pattern has a third domain orientation, and a pixel in a fourth row of the domain pattern has a fourth domain orientation.

Effects according to the embodiments of the present invention are not limited by the contents described above, and furthermore various effects are included herein.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
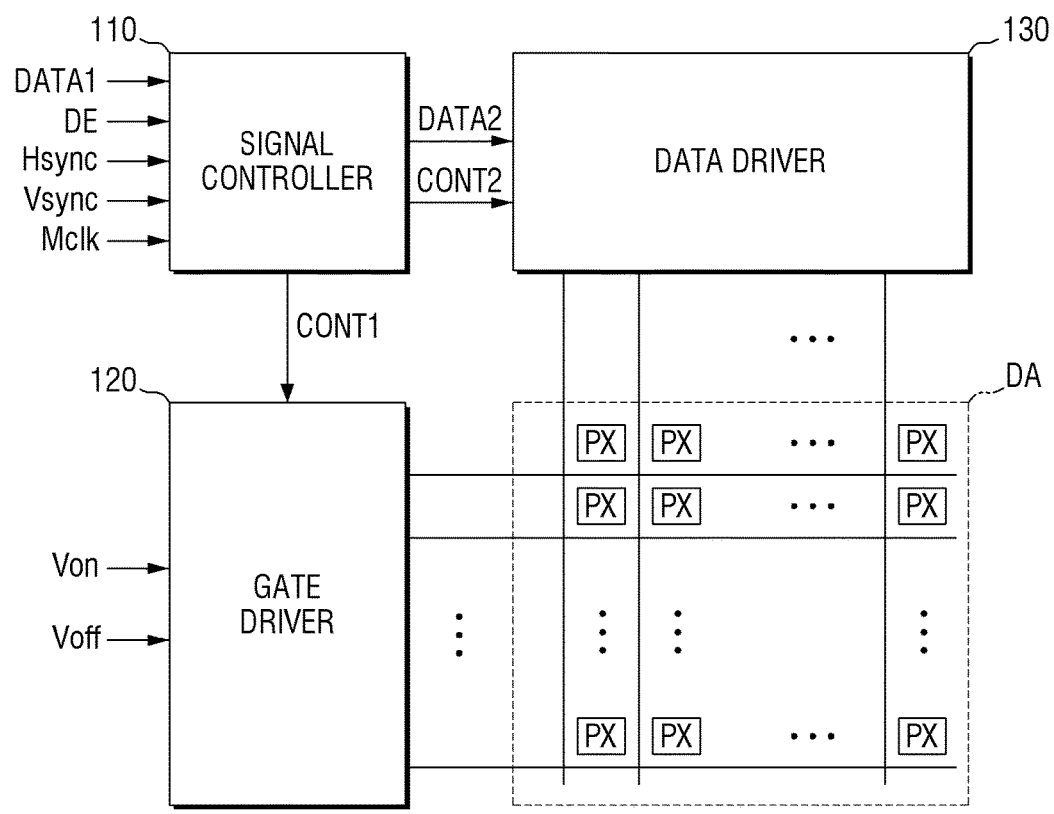
FIG. 1 is a block diagram of a liquid crystal display (LCD) according to an embodiment of the present invention.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached figures, the thickness of layers and regions is exaggerated for clarity. The various figures thus may not be to scale.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

All numerical values are approximate, and may vary. All examples of specific materials and compositions are to be taken as nonlimiting and exemplary only. Other suitable materials and compositions may be used instead.

Hereinafter, embodiments of the present invention will be described with reference to the attached drawings.

FIG. 1 is a block diagram of a liquid crystal display (LCD) 1000 according to an embodiment of the present invention.

Referring to FIG. 1, the LCD 1000 according to the current embodiment includes a gate driver 120, a data driver 130, a signal controller 110, and a display area DA.

The display area DA includes a plurality of pixels PX. The pixels PX may be arranged in a matrix pattern. The display area DA may include a plurality of gate lines GL extending along a first wiring direction and a plurality of data lines DL extending along a second wiring direction intersecting the first wiring direction.

The gate lines GL receive gate signals from the gate driver 120, and the data lines DL receive data signals from the data driver 110. Each of the pixels PX may be disposed at an intersection of a gate line GL and a data line DL.

Each pixel PX may display one of a set of primary colors in order to produce a desired color. In addition, some pixels PX may display a white color. Examples of the primary colors may include red, green, and blue. In the present specification, a pixel which displays red will be referred to as a red pixel, a pixel which displays green will be referred to as a green pixel, a pixel which displays blue will be referred to as a blue pixel, and a pixel which displays white will be referred to as a white pixel. In addition, any color other than red, green and blue can be displayed by bundling the red, green, blue and white pixels together and adjusting the brightness of each of the red, green, blue and white pixels.

A pair of red pixels, a pair of green pixels, a pair of blue pixels and a pair of white pixels may be alternately arranged along a row direction and a column direction. However, the present invention is not limited thereto, and the red pixels, the green pixels, the blue pixels and the white pixels can also be alternately arranged along the row direction. Alternatively, the white pixels may be omitted, and the red pixels, the green pixels and the blue pixels may be alternately arranged along the column direction or may be placed at locations respectively corresponding to three vertices of a triangle. The red pixels, the green pixels, the blue pixels and the white pixels can also be arranged in various other ways, and the arrangement of the red pixels, the green pixels, the blue pixels and the white pixels is not limited to the above arrangement structures.

The signal controller 110 receives various signals from an external source, and controls the gate driver 120 and the data driver 130 using the received signals. For example, the signal controller 110 may receive from the external source first image data DATA1 and input control signals for controlling the display of the first image data DATA1. Then, the signal controller 110 may output a gate driver control signal CONT1, a data driver control signal CONT2, and second image data DATA2.

The first image data DATA1 may include luminance information for each pixel PX of the display area DA. The luminance information may have a predetermined number of gray values such as 1024 ($=2^{10}$), 256 ($=2^8$), or 64 ($=2^6$) gray values. However, the present invention is not limited thereto, and the luminance information can also have a different number of gray values from the above examples. The input first image data DATA1 may be divided into frames.

The input control signals input to the signal controller 110 may include, for example, a vertical synchronization signal Vsync, a horizontal synchronization signal Hsync, a main clock Mclk, and a data enable signal DE. However, the input control signals are not limited to the above examples, and other types of signals can further be input to the signal controller 110.

The gate driver control signal CONT1 may be generated by the signal controller 110 to control the operation of the gate driver 120. The gate driver control signal CONT1 may include a scan start signal and a clock signal. However, the present invention is not limited thereto, and the gate driver control signal CONT1 may, for example, further include other signals. The gate driver 120 may generate a plurality of gate signals that can activate the pixels PX of the display area DA in response to the gate driver control signal CONT1, and transmit the generated gate signals to corresponding ones of the gate lines GL.

The data driver control signal CONT2 may be generated by the signal controller 110 to control the operation of the data driver 130. The data driver 130 may generate a plurality of data signals according to the data driver control signal CONT2, and transmit the generated data signals to corresponding ones of the data lines DL.

Figure 2:
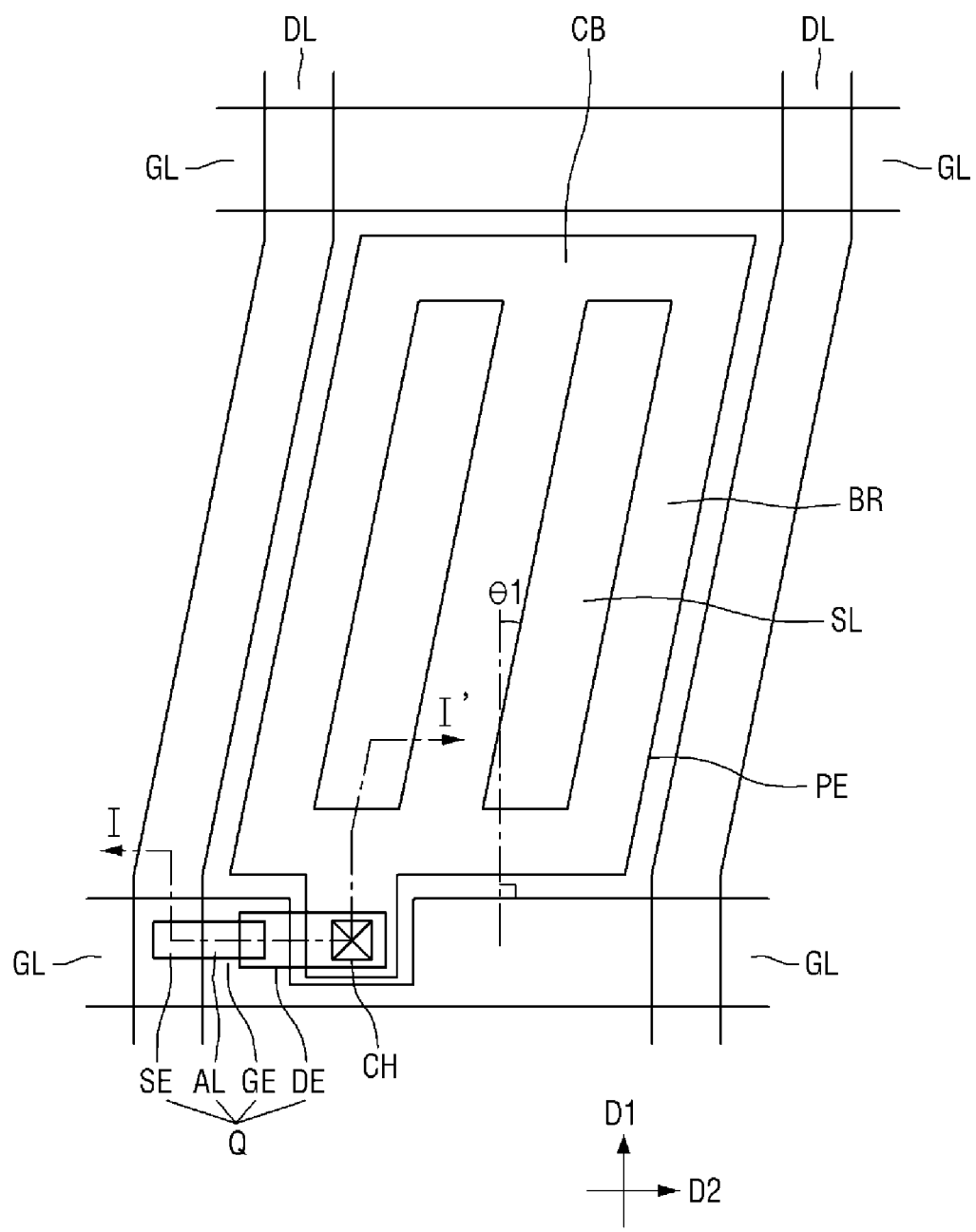
FIG. 2 is a plan view of a pixel according to an embodiment of the present invention.
Figure 3:
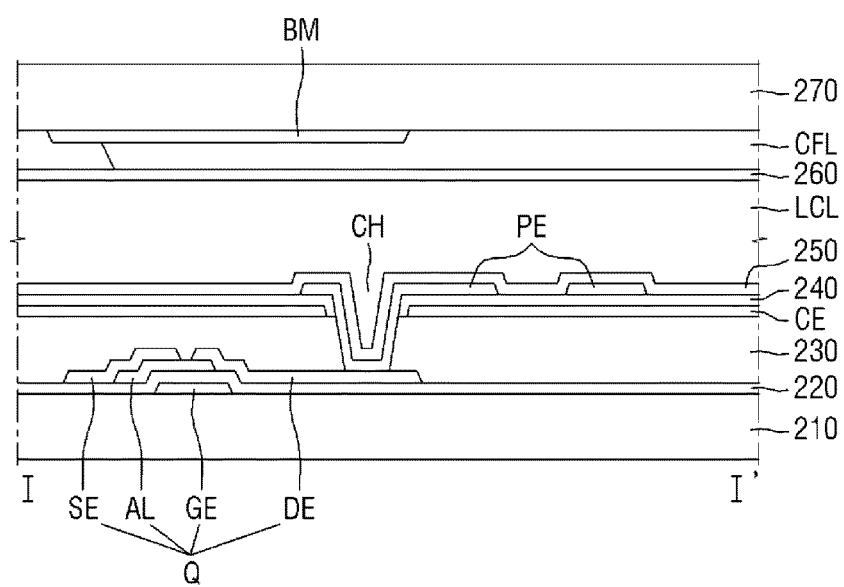
FIG. 3 is a cross-sectional view taken along the line I-I' of FIG. 2.

FIG. 2 is a plan view of a pixel according to an embodiment of the present invention. FIG. 3 is a cross-sectional view taken along the line I-I' of FIG. 2.

Referring to FIGS. 2 and 3, the LCD 1000 according to the current embodiment includes a first insulating substrate 210 and a second insulating substrate 270 which face each other, and a liquid crystal layer LCL which is interposed between the two substrates 210 and 270.

A gate line GL may be disposed on the first insulating substrate 210 and may be located under the second insulating substrate 270. A first insulating layer 220 may be disposed on the gate line GL.

A semiconductor layer AL may be disposed on the first insulating layer 220. The semiconductor layer AL may overlap a region of the gate line GL. Here, the region of the gate line GL which is overlapped by the semiconductor layer AL may be defined as a gate electrode GE, and the gate line GL includes the gate electrode GE.

Although not illustrated in the drawings, an ohmic contact member may be additionally disposed on the semiconductor layer AL. The semiconductor layer AL may be made of a semiconductor material such as amorphous silicon or oxide semiconductor, to pass or block an electric current according to a voltage provided to the gate electrode GE. The ohmic contact member may be made of a semiconductor material doped with impurities, so as to form an ohmic contact between each of a source electrode SE and a drain electrode DE thereon and the semiconductor layer AL thereunder.

A data line DL and the drain electrode DE may be disposed on the semiconductor layer AL and the first insulating layer 220. The data line DL intersects the gate line GL. Multiple data lines DL may be provided, and the data lines DL may be separated from each other.

A region of the data line DL may overlap the semiconductor layer AL. The region of the data line DL which overlaps the semiconductor layer AL may be defined as the source electrode SE. The data line DL includes the source electrode SE.

The source electrode SE is disposed on the semiconductor layer AL. The drain electrode DE disposed on the semiconductor layer AL is separated from the source electrode SE. Here, when a channel is formed in the semiconductor layer AL in response to a gate-on voltage applied to the gate electrode GE, a data voltage applied to the data line DL may be provided to the drain electrode DE via the source electrode SE and the semiconductor layer AL.

A first passivation layer 230 may be disposed on the data line DL, the source electrode SE, and the drain electrode DE. The first passivation layer 230 can be formed to overlap all regions of the display area DA, excluding a region in which a contact hole CH is formed. In addition, the first passivation layer 230 may include an inorganic insulating material or an organic insulating material.

The first passivation layer 230 may also be a stack of two or more layers. For example, an inorganic passivation layer (not illustrated) made of an inorganic insulating material may be provided, and an organic passivation layer (not illustrated) made of an organic insulating material may be disposed on the inorganic passivation layer.

A common electrode CE may be disposed on the first passivation layer 230. Like the first passivation layer 230, the common electrode CE may also be disposed in all regions of the display area DA, excluding the region in which the contact hole CH is formed.

The common electrode CE may generate an electric field, which acts on the liquid crystal layer LCL, together with a pixel electrode PE.

A second passivation layer 240 may be disposed on the common electrode CE. The second passivation layer 240 may insulate the common electrode CE from another layer formed on the second passivation layer 240, and in particular may act to separate the common electrode CE from other layers by a distance corresponding to a thickness of the second passivation layer 240.

The pixel electrode PE is disposed on the second passivation layer 240. The pixel electrode PE may be disposed in a pixel region defined as a region surrounded by an adjacent data line DL and an adjacent gate line GL. The pixel electrode PE may include a plurality of branches BR which are disposed in the middle of the pixel region and separated from each other, a plurality of slits SL which correspond to openings between the branches BR, and a connecting bar CB which connects the branches BR.

The pixel electrode PE may form a liquid crystal capacitor Clc by interacting with the common electrode CE. In addition, the pixel electrode PE may include a storage capacitor Cst as is known. However, the storage capacitor Cst can be omitted if desired. In the current embodiment, the storage capacitor Cst is omitted.

A first alignment layer 250 may be disposed on the pixel electrode PE. The first alignment layer 250 may be a horizontal and vertical alignment layer. That is, the first alignment layer 250 may arrange adjacent liquid crystal molecules of the liquid crystal layer LCL to face in a certain direction in a horizontal plane, and align the liquid crystal molecules at a predetermined pretilt angle in a vertical direction. That is, in an initial state in which no electric field has been formed between the pixel electrode PE and the common electrode CE, the liquid crystal molecules of the liquid crystal layer LCL located on the first alignment layer 250 may be arranged to face in a certain direction along the first alignment layer 250, and may be pretilted at an angle of 0.5 to 3 degrees to a direction perpendicular to the upper surface of the first alignment layer 250.

If the LCD 1000 according to the current embodiment is a normally black mode LCD which displays black in an initial state in which no electric field has been formed between the pixel electrode PE and the common electrode CE, the liquid crystal molecules may be arranged in a certain direction by the first alignment layer 250, and black may be displayed due to this alignment direction of the liquid crystal molecules and the interaction with a polarizing plate which will be described later.

The second insulating substrate 270 is placed to face the first insulating substrate 210. A light-blocking member BM may be disposed under the second insulating substrate 270. The light-blocking member BM may block light and may be formed as a plurality of bands arranged at regular intervals, or may be formed in a lattice pattern. That is, the light-blocking member BM may overlap all regions excluding a region in which the pixel electrode PE is disposed, thereby preventing the leakage of light.

A color filter layer CFL may be disposed on the second insulating substrate 270 and the light-blocking member BM. The color filter layer CFL may include a plurality of color filters CF. Each of the color filters CF may transmit a particular wavelength band of incident light and block the other wavelength bands, such that light emerging from each of the color filters CF takes on a particular color.

For example, the color filter layer CFL may include a red color filter which transmits light of a wavelength band corresponding to red light, a green color filter which transmits light of a wavelength band corresponding to green light, and a blue color filter which transmits light of a wavelength band corresponding to blue light. Here, the red color filter may transmit light of a wavelength band of approximately 580 to 780 nm and reflect light of the other wavelength bands, the green color filter may transmit light of a wavelength band of approximately 450 to 650 nm and reflect light of the other wavelength bands, and the blue color filter may transmit light of a wavelength band of approximately 380 to 560 nm and reflect light of the other wavelength bands.

The color filter layer CFL may be made of pigments or photosensitive organic matter which produces red, green and blue colors. The colors of light transmitted from the color filter layer CFL are not limited to red, green and blue, and materials that transmit light of wavelength bands corresponding to other colors can also be used for the color filter layer CFL. In addition, the color filter layer CFL can produce a transparent color by transmitting light of all wavelength bands. That is, the color filter layer CFL may be transparent, in addition to having any desired color.

The light-blocking member BM and the color filter layer CFL are not necessarily formed adjacent to the second insulating substrate 270, but can also be formed on the first insulating substrate 210. In this case, the first passivation layer 230 disposed on the first insulating substrate 210 may be omitted, and the color filter layer CFL may be formed here instead. Accordingly, the color filter layer CFL may also function as the first passivation layer 230. In this case, the LCD 1000 may become thinner. In addition, since some processes are omitted, production costs can be saved. The color filter layer CFL can also be formed in place of a layer other than the first passivation layer 230.

Although not illustrated in the drawings, a cover layer (not illustrated) may be disposed under the light-blocking member BM and the color filter layer CFL. The cover layer (not illustrated) can prevent the color filter layer CFL and the light-blocking member BM from moving out of position and can prevent a defect, such as an afterimage created during screen driving, by suppressing contamination of the liquid crystal layer LCL due to organic matter (e.g., a solvent) introduced from the color filter layer CFL.

The liquid crystal layer LCL may be disposed between the first insulating substrate 210 and the second insulating substrate 270, and may control the intensity of light transmitting therethrough. The liquid crystal layer LCL may include a plurality of liquid crystal molecules having dielectric anisotropy. The liquid crystal molecules may have positive dielectric anisotropy. Therefore, long axes of the liquid crystal molecules may be arranged in a direction horizontal to an applied electric field. However, the present invention is not limited thereto, and the liquid crystal molecules can also have negative dielectric anisotropy. In this case, the long axes of the liquid crystal molecules may be arranged in a direction perpendicular to the applied electric field.

When an electric field is formed between the common electrode CE and the pixel electrode PE, adjacent liquid crystal molecules are rearranged in a certain direction, and the polarization of light that passes through the rearranged liquid crystal molecules is changed by the optical anisotropy of the rearranged liquid crystal molecules. Accordingly, the light may be transmitted or blocked by the polarizing plate (not illustrated) of each of the first insulating substrate 210 and the second insulating substrate 270. Here, the term 'rearranged' denotes that the liquid crystal molecules are mostly rotated by the effect of the electric field formed between the common electrode CE and the pixel electrode PE.

The pixel electrode PE may include the branches BR separated from each other, the slits SL formed between the branches BR, and the connecting bar CB connecting the branches BR. Here, the branches BR and the slits SL may tilt, or be oriented, at a predetermined angle with respect to a direction perpendicular to the gate line GL.

Although not illustrated in the drawings, in one pixel PX of the LCD 1000 according to another embodiment of the present invention, branches BR and slits SL of a pixel electrode may tilt in a different direction from the branches BR and the slits SL of the pixel electrode PE according to the previous embodiment. Further, since various types of pixels are disposed in the display area DA, a viewing angle can be improved. This will be described in greater detail later with reference to FIG. 4.

A section of the data line DL which is disposed adjacent to each pixel PX, that is a section of the data line DL which is disposed adjacent to the pixel electrode PE, may be oriented parallel to the branches BR and the slits SL of the pixel electrode PE. Accordingly, in a pixel region defined as a region surrounded by an adjacent data line DL and an adjacent gate line GL, control over liquid crystal molecules of the pixel electrode PE may be increased, thereby improving transmittance.

Figure 4:
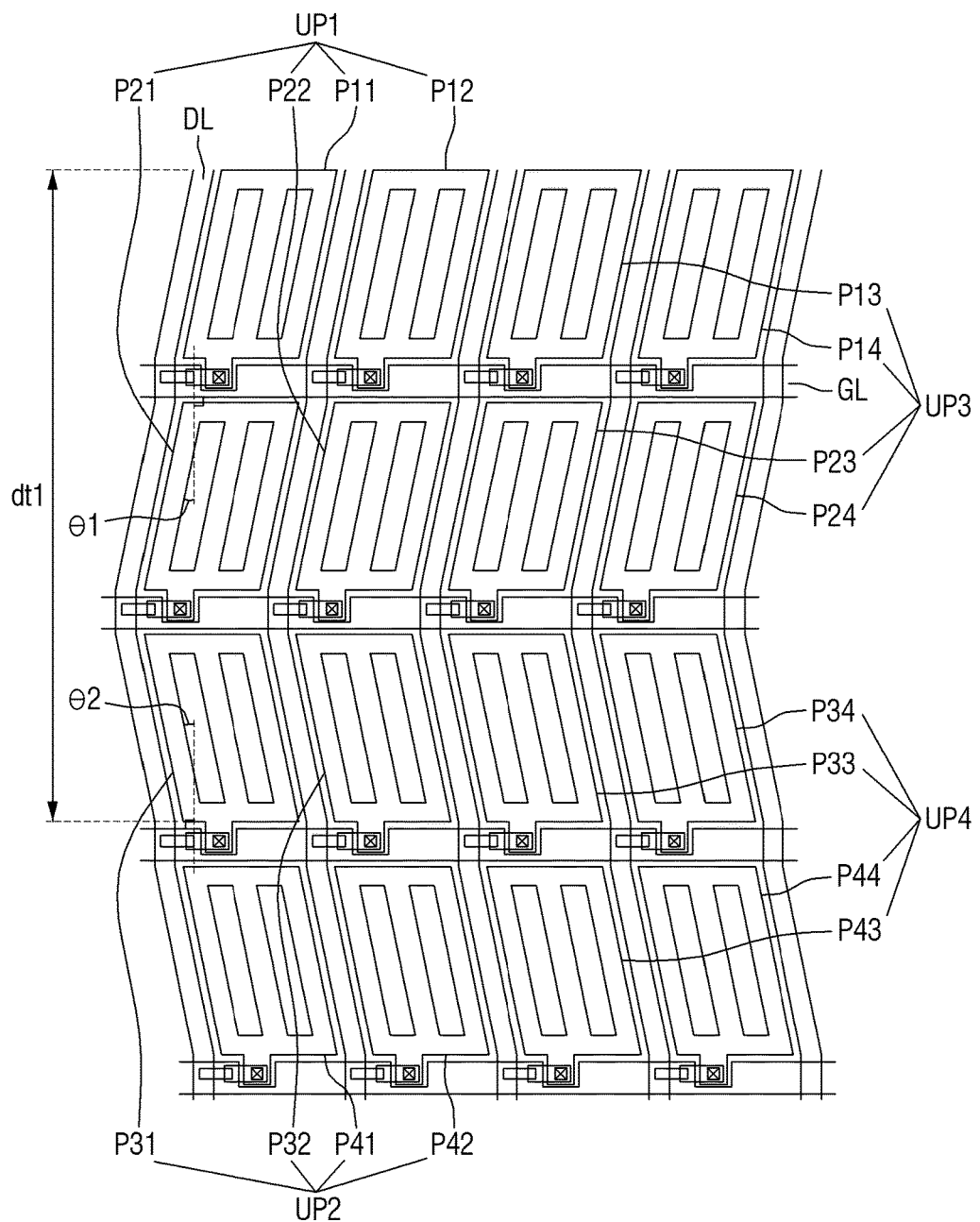
FIG. 4 is a plan view of a plurality of pixels according to an embodiment of the present invention.

FIG. 4 is a plan view of a plurality of pixels according to an embodiment of the present invention.

In FIG. 4, 16 pixels located in a region of the display area DA of the LCD 1000 of FIG. 1 are illustrated as an example.

Referring to FIG. 4, each of a plurality of pixels P11 through P44 according to an embodiment of the present invention forms one domain. In addition, two types of domains are formed by the pixels P11 through P44. Each of the pixels P11 through P44 is disposed in a region surrounded by a gate line GL extending substantially in the column direction, and a data line DL extending substantially in the row direction. In addition, a switching device Q, which delivers a data signal from the data line DL to the pixel electrode PE, may be disposed below the pixel electrode PE.

As used herein, the term "row direction" means a direction in which the number of rows increases rather than a direction in which a row extends, and the term "column direction" means a direction in which the number of columns increases rather than a direction in which a column extends. That is, the row direction is a direction extending from the upper side to the lower side of the plane on which the pixels are arranged as shown in FIG. 4. Further, the column direction is a direction extending from the left side to the right side of the plane on which the pixels are arranged as shown in FIG. 4.

The branches BR and the slits SL of the pixel electrode PE included in each of the pixels P11 through P44 may be oriented to form a particular included angle with their respective gate lines GL. The pixels P11 through P24 may each form a first domain by forming a first angle θ1 as an included angle, and the pixels P31 through P44 may each form a second domain by forming a second angle θ2 as an included angle.

The pixels P11 through P44 shown in FIG. 4 may be defined as first row first column through fourth row fourth column pixels P11 through P44, respectively. In this case, the pixels P11 through P24 disposed in the first row and the second row may collectively form the first domain, and the pixels P31 through P44 disposed in the third row and the fourth row may together form the second domain.

Here, the pixel electrode PE included in each of the pixels P11 through P24 in the first and second rows may include branches BR which tilt in a clockwise direction at the first angle θ1 with respect to the direction perpendicular to the gate lines GL, thereby forming the first domain. The pixel electrode PE included in each of the pixels P31 through P44 in the third and fourth rows may include branches BR which tilt in a counterclockwise direction at the second angle θ2 with respect to the direction perpendicular to the gate lines GL, thereby forming the second domain. In addition, the first angle θ1 and the second angle θ2 may have the same absolute value, such that the first domain and the second domain are symmetric with respect to the direction perpendicular to the gate lines GL.

Here, two pixels (e.g., P11 and P31) disposed in non-successive rows and in the same column may express the same color. This can improve the asymmetry of a horizontal viewing angle.

In FIG. 4, 16 pixels P11 through P44 are illustrated as an example. However, the number of pixels actually disposed in the display area DA may be different from, e.g. far larger than, 16. Here, four pixels arranged successively in the row direction may be defined as one domain pattern. In this case, the domain pattern may be repeated in the row direction and the column direction in the display area DA, thereby forming the LCD 1000.

In addition, two pixels arranged successively in the row direction may be controlled by different gate lines GL, respectively.

In addition, four pixels disposed adjacent to each other in the row direction and the column direction may be defined as one pixel group UP. Pixels included in one pixel group UP may display different colors. In an example, the first row first column pixel P11, the first row second column pixel P12, the second row first column pixel P21 and the second row second column pixel P22 may form a first pixel group UP1. This will be described in greater detail later with reference to FIG. 6.

For example, the first row first column pixel P11 included in the first pixel group UP1 and the third row first column pixel P31 included in a second pixel group UP2 may display the same color but have differently-oriented domains. In this case, even if each of the pixels P11 and P31 has only one domain orientation, the pixels P11 and P31 can gather together to form two domain orientations, thereby improving the horizontal viewing angle. However, since the first row first column pixel P11 and the third row first column pixel P31 are different pixels, they may display different gray levels. When the pixels P11 and P31 are sufficiently small in size, even if the two pixels P11 and P31 display different gray levels, the different gray levels cannot be distinguished with the naked eye. Therefore, a horizontal line may not be seen.

Here, when two different pixels which display the same color and have differently-oriented domains are all disposed within 150 µm, a horizontal line may not be seen. Specifically, when a distance dt1 between an upper end of the pixel electrode PE of the first row first column pixel P11 and a lower end of the pixel electrode PE of the third row first column pixel P31 is 150 µm or less, even if data signals indicating different gray levels are provided to the two pixels P11 and P31, a horizontal line may not be seen.

When two differently-oriented domains are formed in two different pixels disposed non-successively as described above, higher transmittance can be obtained than when two domains are formed in one pixel. This will now be described with reference to FIG. 5.

Figure 5:
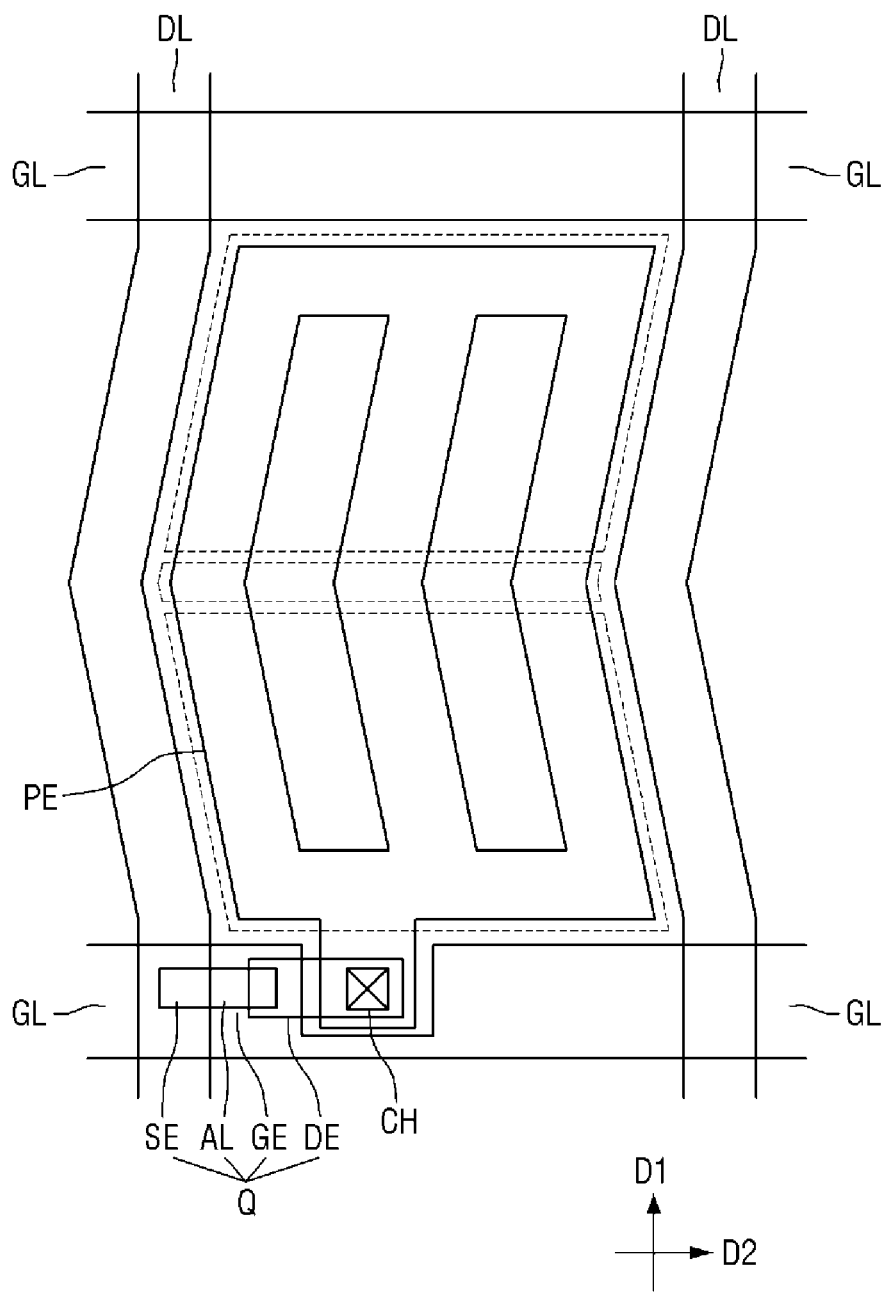
FIG. 5 is a plan view of a pixel according to another embodiment of the present invention.

FIG. 5 is a plan view of a pixel according to another embodiment of the present invention.

Elements of FIG. 5 that are identical to those of FIG. 2, are omitted from any further detailed description below.

Referring to FIG. 5, a pixel electrode, unlike the pixel electrode PE of FIG. 2, includes a bent part in the middle thereof, so that two domains are formed in one pixel. Here, liquid crystal molecules around a region in which the bent part of the pixel electrode is disposed may be affected by both a first domain and a second domain. Accordingly, the liquid crystal molecules may be rearranged irregularly or may not be rearranged in one direction. Therefore, the region in which the bent part is disposed may be displayed darker than its surrounding region or may be displayed in black, thus reducing the transmittance of the LCD 1000. On the other hand, since only one domain is formed in the pixel of FIG. 2, the bent part is not formed, thus improving transmittance.

The color arrangement of pixels will now be described with reference to FIG. 4 again.

As described above, the first row first column pixel P11, the first row second column pixel P12, the second row first column pixel P21, and the second row second column pixel P22 may form the first pixel group UP1, and the third row first column P31, the third row second column pixel P32, the fourth row first column pixel P41 and the fourth row second column pixel P42 may form the second pixel group UP2. In addition, pixels located at corresponding positions in the first pixel group UP1 and the second pixel group UP2 may display the same color and form different domains, thereby improving the viewing angle.

Likewise, the first row third column pixel P13, the first row fourth column pixel P14, the second row third column pixel P23 and the second row fourth column pixel P24 may form a third pixel group UP3, and the third row third column pixel P33, the third row fourth column pixel P34, the fourth row third column pixel P43 and the fourth row fourth column pixel P44 may form a fourth pixel group UP4. In addition, pixels located at corresponding positions in the third pixel group UP3 and the fourth pixel group UP4 may display the same color and form different domains, thereby improving viewing angle.

The color display of the first through fourth pixel groups UP1 through UP4 will now be described in greater detail with reference to FIG. 6.

Figure 6:
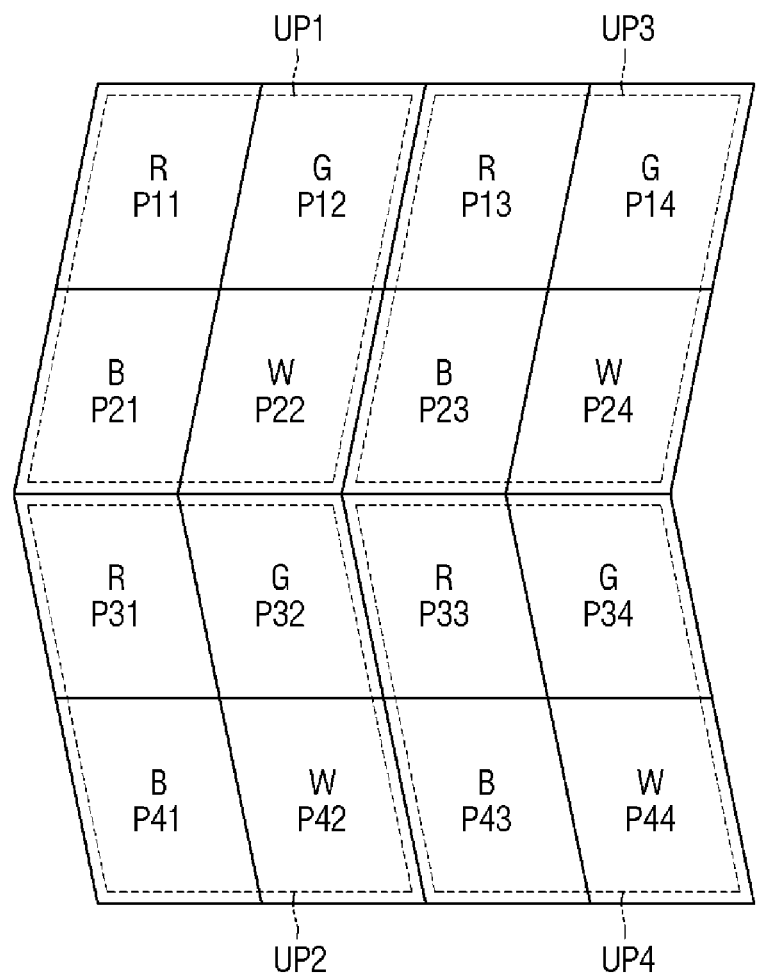
FIG. 6 is a schematic diagram illustrating the color display of pixels according to an embodiment of the present invention.

FIG. 6 is a schematic diagram illustrating the color display of pixels according to an embodiment of the present invention.

Referring to FIG. 6, each of the first through fourth pixel groups UP1 through UP4 may include one red pixel R, one green pixel G, one blue pixel B, and one white pixel W.

Specifically, pixels in two adjacent rows and two adjacent columns may form one pixel group and may be a red pixel R which displays red, a green pixel G which displays green, a blue pixel B which displays blue, and a white pixel W which displays white. For example, the first row first column pixel P11 may be the red pixel R, the first row second column pixel P12 may be the green pixel G, the second row first column pixel P21 may be the blue pixel B, and the second row second column pixel P22 may be the white pixel W. These four pixels may form the first pixel group UP1.

In addition, the third row first column pixel P31 may be the red pixel R, the third row second column pixel P32 may be the green pixel G, the fourth row first column pixel P41 may be the blue pixel B, and the fourth row second column pixel P42 may be the white pixel W. These four pixels may form the second pixel group UP2.

The second pixel group UP2 may be disposed immediately below the first pixel group UP1 in plan view. Each of the pixels P11, P12, P21 and P22 included in the first pixel group UP1 may form the first domain, and each of the pixels P31, P32, P41 and P42 included in the second pixel group UP2 may form the second domain. In addition, the color arrangement order of the first pixel group UP1 may be the same as that of the second pixel group UP2. That is, the red pixel R may be disposed at an upper left corner of each of the first and second pixel groups UP1 and UP2, the green pixel G may be disposed at an upper right corner, the blue pixel B may be disposed at a lower left corner, and the white pixel W may be disposed at a lower right corner.

However, the arrangement of the red pixel R, the green pixel G, the blue pixel B and the white pixel W is not limited to the above example. Any arrangement is contemplated. For example, contrary to FIG. 6, the white pixel W may be disposed at the upper left corner of each pixel group, the blue pixel B may be disposed at the upper right corner, the green pixel G may be disposed at the lower left corner, and the red pixel R may be disposed at the lower right corner. The red pixel R, the green pixel G, the blue pixel B and the white pixel W can also be arranged in various other ways. Even in this case, the color arrangement order of pixels included in adjacent pixel groups may be the same, and corresponding pixels of two pixel groups arranged successively in the row direction may have different domains.

When a white pixel W is used as described above, the transmittance of the LCD 1000 can be improved. This is because the color filter layer CFL of the white pixel W is disposed transmits light of all wavelength bands, whereas the color filter layer CFL of each of the red pixel R, the green pixel G and the blue pixel B only transmits light of a particular wavelength band.

Figure 7:
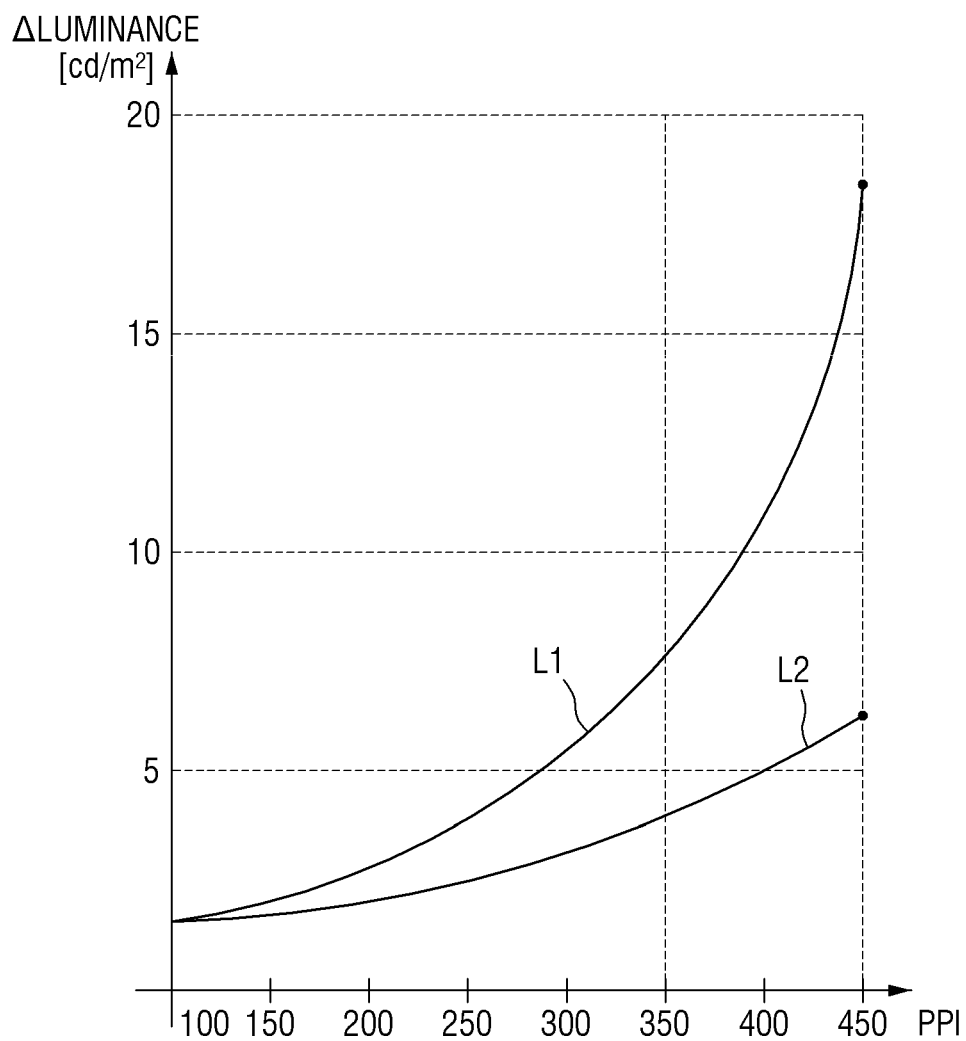
FIG. 7 is a graph illustrating whether a horizontal line is seen on the LCD according to various embodiments of the present invention.

FIG. 7 is a graph illustrating whether a horizontal line is seen on the LCD 1000 according to various embodiments of the present invention.

Referring to FIG. 7, the horizontal axis of the graph represents PPI, which denotes the number of pixel groups per inch. In addition, the vertical axis of the graph represents the difference [$cd/m^2$] in luminance between two non-successive pixels which display the same color but have differently-oriented domains. A first line L1 represents whether a horizontal line is seen on the LCD 1000 from a distance of 250 mm, and a second line L2 represents whether a horizontal line is seen on the LCD 1000 from a distance of 200 mm.

In a region below the first line L1, a horizontal line between two pixels may be seen on the LCD 1000 from the distance of 250 mm. In a region above the first line L1, a horizontal line between two pixels may not be seen on the LCD 1000 from the distance of 250 mm. In addition, in a region below the second line L2, a horizontal line between two pixels may be seen on the LCD 1000 from the distance of 200 mm. In a region above the second line L2, a horizontal line between two pixels may not be seen on the LCD 1000 from the distance of 200 mm.

Each pixel may be controlled by the signal controller 110 to express a certain gray level. The degree of brightness measured when a pixel actually displays a color according to a gray level may correspond to luminance, and the unit of luminance may be [$cd/m^2$].

Referring to the graph, as the value of the x axis increases, the value of each of the first line L1 and the second line L2 on they axis increases. That is, as the resolution increases, a horizontal line may not be seen despite a greater difference in luminance between pixels. In addition, since the first line L1 is always formed above the second line L2, it can be understood that a horizontal line is more visible as the distance to the LCD 1000 decreases.

In view of all these factors, it can be understood that a horizontal line is generally not seen when two pixels which are not successive and have differently-oriented domains are placed within 150 mm.

Figure 8:
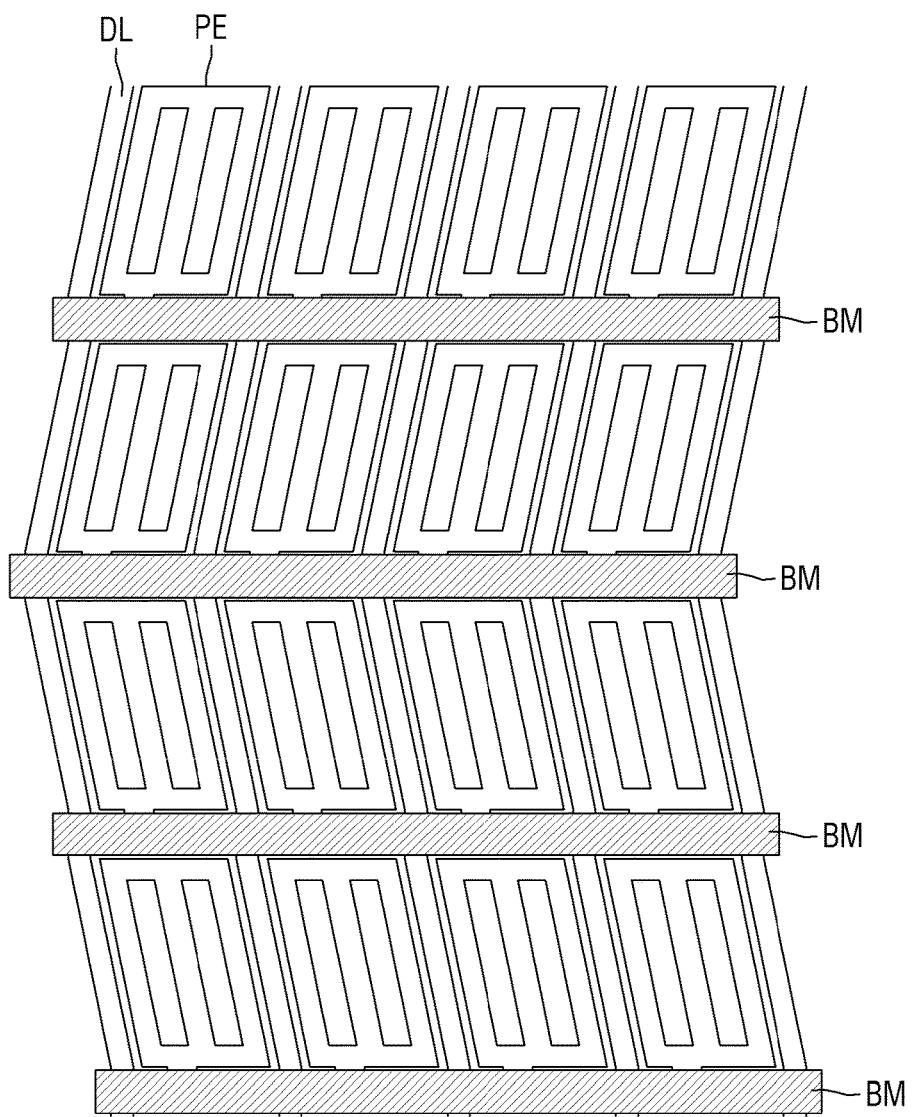
FIG. 8 is a plan view of a plurality of pixels having a light-blocking member according to an embodiment of the present invention.

FIG. 8 is a plan view of a plurality of pixels having the light-blocking member BM according to an embodiment of the present invention.

Detailed description is omitted for those elements of FIG. 8 that are identical to those of FIG. 4.

Referring to FIG. 8, a light-blocking member BM may extend along the column direction and may not be formed along the row direction. Therefore, part of a data line DL extending along the row direction may be exposed.

Since the light-blocking member BM is not formed along the row direction, the transmittance of the LCD 1000 can be improved.

Figure 9:
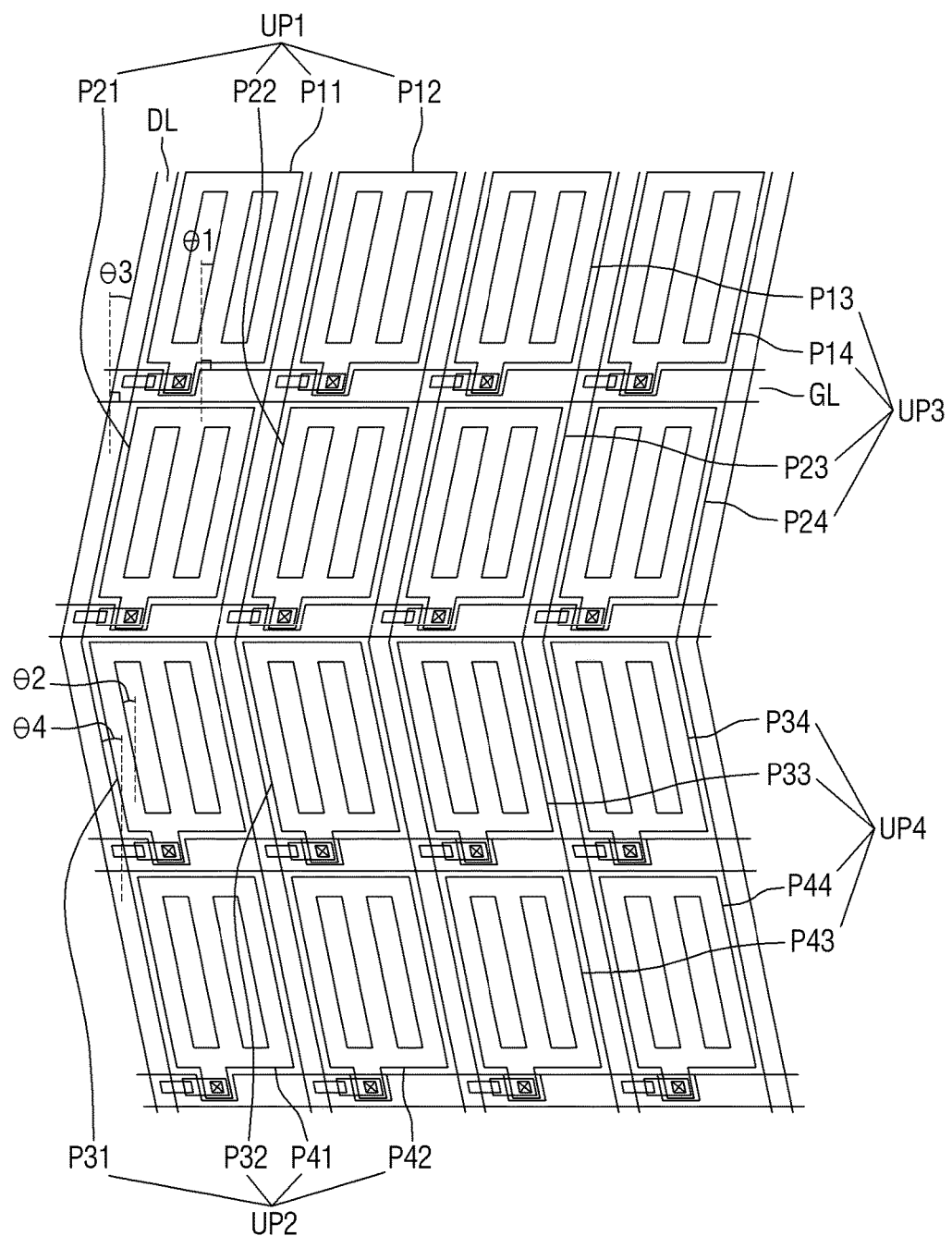
FIG. 9 is a plan view of a plurality of pixels according to another embodiment of the present invention.

FIG. 9 is a plan view of a plurality of pixels according to another embodiment of the present invention.

Detailed description is omitted for those elements of FIG. 9 that are identical to those of FIG. 4.

Referring to FIG. 9, unlike in FIG. 4, portions of each data line DL adjacent to switching devices Q of each pixel are also tilted.

Specifically, in a region in which the row pixels P11 through P14 and P21 through P24 tilt in a clockwise direction at a first angle θ1 with respect to a direction perpendicular to gate lines GL, a data line DL may tilt in the clockwise direction at a third angle θ3 with respect to the direction perpendicular to the gate lines GL. The first angle θ1 and the third angle θ3 may have the same absolute value.

In addition, in a region in which the row pixels P31 through P34 and P41 through P44 tilt in a counterclockwise direction at a second angle θ2 with respect to the direction perpendicular to the gate lines GL, the data line DL may tilt in the counterclockwise direction at a fourth angle θ4 with respect to the direction perpendicular to the gate lines GL. The second angle θ2 and the fourth angle θ4 may have the same absolute value.

Therefore, all sections of each data line DL may tilt parallel to slits SL and branches BR of the pixel electrode PE. Since each data line DL has fewer bends, it can be designed more easily.

Figure 10:
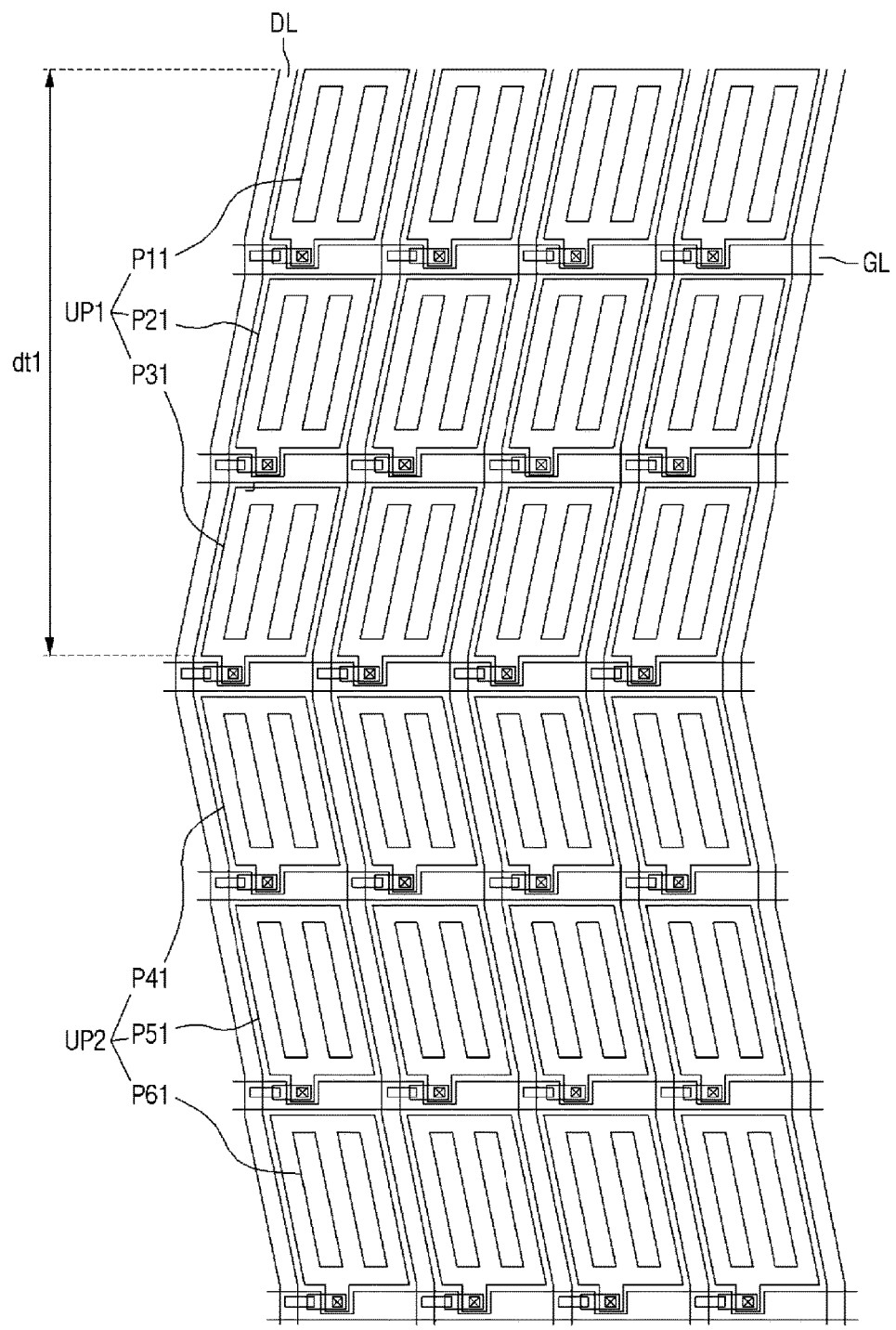
FIG. 10 is a plan view of a plurality of pixels according to another embodiment of the present invention.
Figure 11:
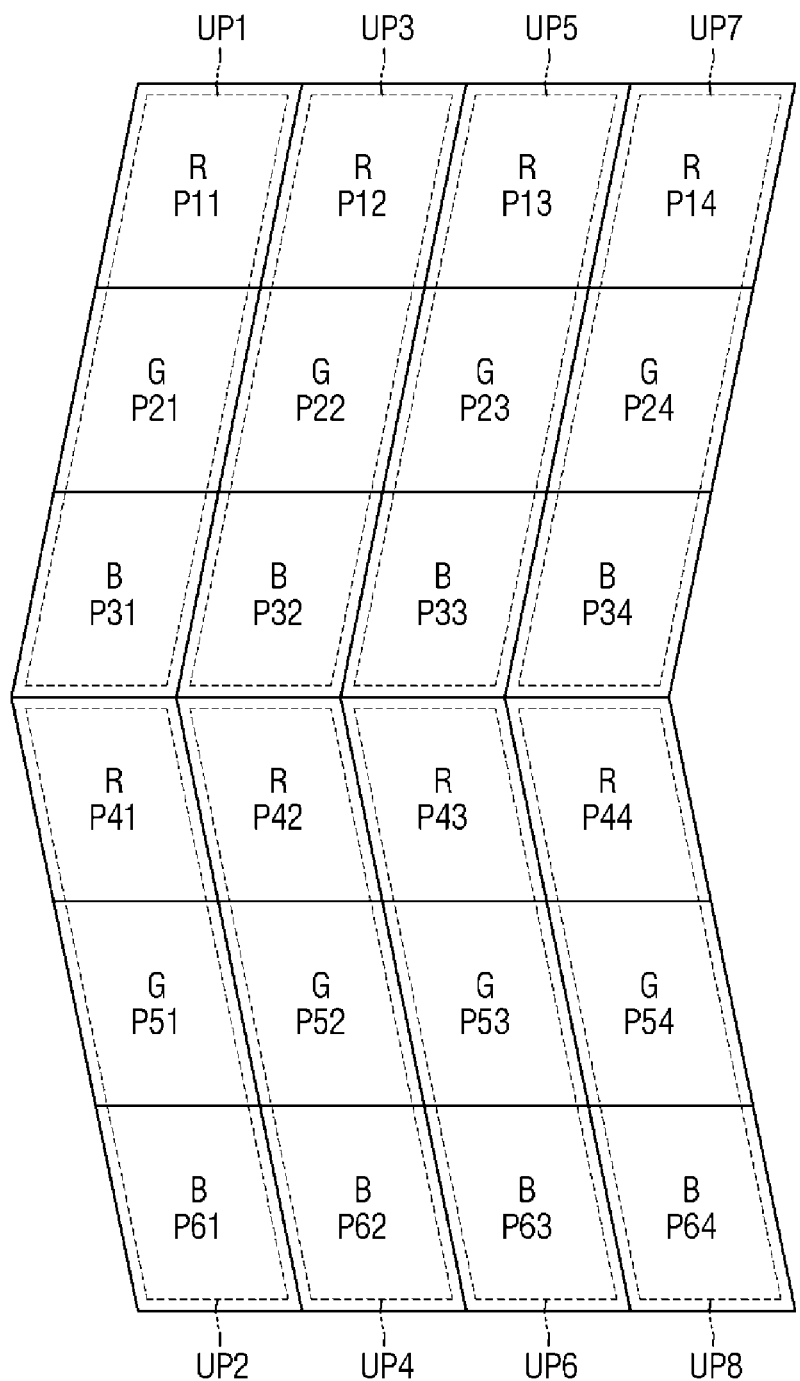
FIG. 11 is a schematic diagram illustrating the color display of pixels according to another embodiment of the present invention.

FIG. 10 is a plan view of a plurality of pixels according to another embodiment of the present invention. FIG. 11 is a schematic diagram illustrating the color display of pixels according to another embodiment of the present invention.

Detailed description is omitted for those elements of FIG. 10 that are identical to those of FIG. 4. In addition, detailed description is omitted for those elements of FIG. 11 that are identical to those of FIG. 6.

Referring to FIGS. 10 and 11, unlike in FIGS. 4 and 6, six pixels arranged successively in a row direction may form one domain pattern, and three pixels arranged successively in the row direction may form one pixel group. In addition, two pixel groups arranged successively in the row direction may form different domains. Also, in each of pixel groups arranged successively in the row direction, a red pixel R may be disposed in a first row, a green pixel G may be disposed in a second row, and a blue pixel B may be disposed in a third row.

Accordingly, a first red pixel R which forms a first domain can improve the viewing angle together with another red pixel R which is separated from the first red pixel R by three pixels in the row direction and forms a second domain. In addition, a first green pixel G which forms the second domain can improve the viewing angle together with another green pixel G which is separated from a first green pixel G by three pixels in the row direction and forms the second domain. A first blue pixel B which forms the first domain can improve the viewing angle together with another blue pixel B which is separated from the first blue pixel B by three pixels in the row direction and forms the second domain.

The arrangement order of the red pixel R, the green pixel G, and the blue pixel B in each pixel group is not limited to the above example and can be changed. Even in this case, the arrangement order of the red pixel R, the green pixel G and the blue pixel B may, though need not necessarily, be the same in two pixel groups which form different domains.

When a white pixel W is not used while the red pixel R, the green pixel G and the blue pixel B are used as described above, the area occupied by one pixel group can be reduced. Therefore, higher resolution can be obtained for the same area.

Figure 12:
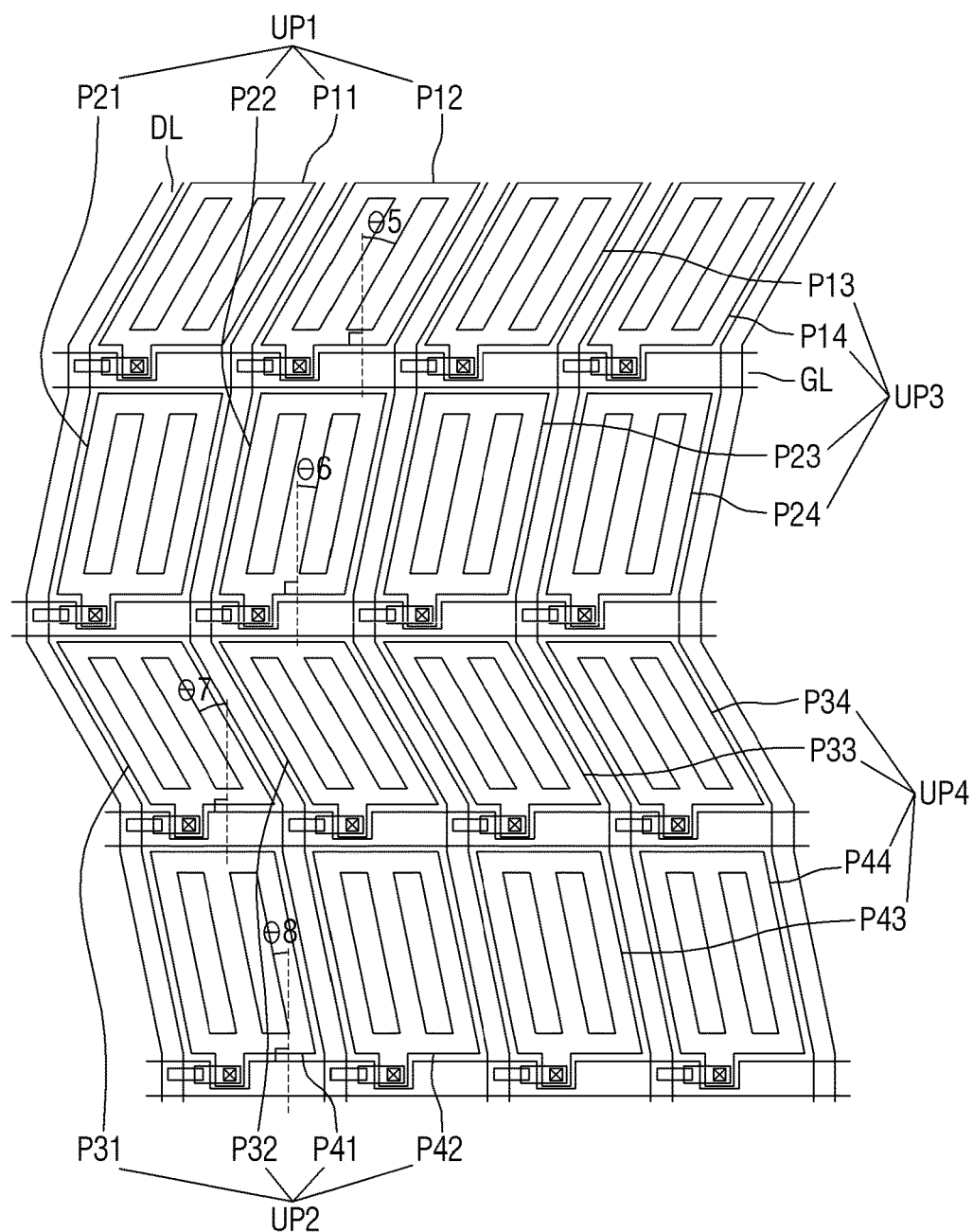
FIG. 12 is a plan view of a plurality of pixels according to another embodiment of the present invention.

FIG. 12 is a plan view of a plurality of pixels according to another embodiment of the present invention.

Detailed description is omitted for those elements of FIG. 12 that are identical to those of FIG. 4.

Referring to FIG. 12, unlike in FIG. 4, pixels included in one pixel group may form differently-oriented domains.

Specifically, a pixel electrode PE in each of a first row first column pixel P11 and a first row second column pixel P12 may form a third domain by tilting in a clockwise direction at a fifth angle θ5 to a direction perpendicular to gate lines GL, and a pixel electrode PE in each of a second row first column pixel P21 and a second row second column pixel P22 may form a fourth domain by tilting in the clockwise direction at a sixth angle θ6 to the direction perpendicular to the gate lines GL. In addition, the first row first column pixel P11, the first row second column pixel P12, the second row first column pixel P21, and the second row second column pixel P22 may form a first pixel group UP1. That is, unlike in FIG. 4, pixels in different rows within one pixel group may have differently-oriented domains.

In addition, a pixel electrode PE in each of a third row first column pixel P31 and a third row second column pixel P32 may form a fifth domain by tilting in a counterclockwise direction at a seventh angle θ7 to the direction perpendicular to the gate lines GL, and a pixel electrode PE in each of a fourth row first column pixel P41 and a fourth row second column pixel P42 may form a sixth domain by tilting in the counterclockwise direction at an eighth angle θ8 to the direction perpendicular to the gate lines GL. In addition, the third row first column pixel P31, the third row second column pixel P32, the fourth row first column pixel P41, and the fourth row second column pixel P42 may form a second pixel group UP2. As in the first pixel group UP1, pixels in different rows within the second pixel group UP2 may have differently-oriented domains.

Further, the fifth angle θ5 and the seventh angle θ7 may have the same absolute value, and the sixth angle θ6 and the eighth angle θ8 may have the same absolute value. In addition, the pixel electrode PE of each of the pixels P11, P12, P21 and P22 included in the first pixel group UP1 may tilt in the clockwise direction from the direction perpendicular to the gate lines GL, and the pixel electrode PE of each of the pixels P31, P32, P41 and P42 included in the second pixel group UP2 may tilt in the counterclockwise direction from the direction perpendicular to the gate lines GL. Also, the absolute values of the fifth angle θ5 and the seventh angle θ7 may be greater than those of the sixth angle θ6 and the eighth angle θ8.

The above structure can improve viewing angle.

That is, the pixels P11 and P12 in a first row of the first pixel group UP1 and the pixels P31 and P32 in a first row of the second pixel group UP2 may form two domains by tilting in different directions but at the same angle to the direction perpendicular to the gate lines GL. In addition, the pixels P21 and P22 in a second row of the first pixel group UP1 and the pixels P41 and P42 in a second row of the second pixel group UP2 may form two domains by tilting in different directions but at the same angle to the direction perpendicular to the gate lines GL. Further, the pixels P11 and P12 in the first row of the first pixel groups UP1 may tilt at a different angle from the pixels P21 and P22 in the second row of the first pixel group UP1. In this case, since pixels having four different orientations can be placed in the display area DA, an improvement in viewing angle can be maximized.

Even in the above case, pixels which form a pair of differently-oriented domains may display the same color. For example, when the first row first column pixel P11 is a red pixel R, the third row first column pixel P31 may also be a red pixel R. When the first row second column pixel P12 is a green pixel G, the third row second column pixel P32 may also be a green pixel G. When the second row first column pixel P21 is a blue pixel B, the fourth row first column pixel P41 may also be a blue pixel B. When the second row second column pixel P22 is a white pixel W, the fourth row second column pixel P42 may also be a white pixel W.

Figure 13:
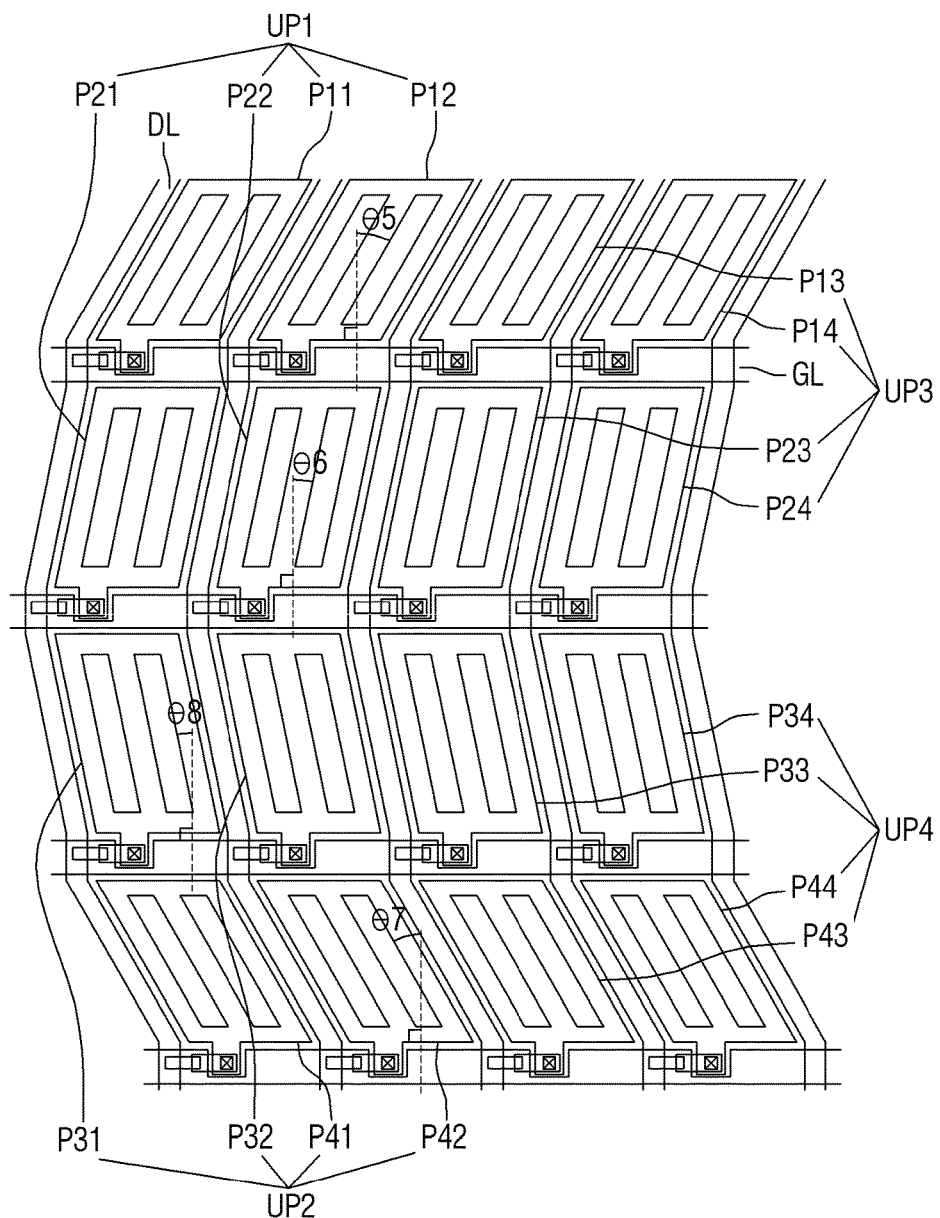
FIG. 13 is a plan view of a plurality of pixels according to another embodiment of the present invention.

FIG. 13 is a plan view of a plurality of pixels according to another embodiment of the present invention.

Detailed description is omitted for those elements of FIG. 13 that are identical to those of FIG. 12.

Referring to FIG. 13, unlike in FIG. 12, pixels in a first row of a first pixel group UP1 and a second row of a second pixel group UP2 may form domains which are symmetrically arranged, and a second row of the first pixel group UP1 and a first row of the second pixel group UP2 may form domains which are symmetrically arranged.

Accordingly, a pixel electrode PE of each of pixels P31 through P34 disposed in a third row may tilt in a counterclockwise direction at an eighth angle θ8 to a direction perpendicular to gate lines GL, and a pixel electrode PE of each of pixels P41 through P44 disposed in a fourth row may tilt in the counterclockwise direction at a seventh angle θ7 to the direction perpendicular to the gate lines GL. This is the reverse of the structure of FIG. 12, in which the pixel electrode PE of each of the pixels P31 through P34 disposed in the third row tilts at the seventh angle θ7 to the direction perpendicular to the gate lines GL and the pixel electrode PE of each of the pixels P41 through P44 disposed in the fourth row tilts at the eighth angle θ8 to the direction perpendicular to the gate lines GL.

Figure 14:
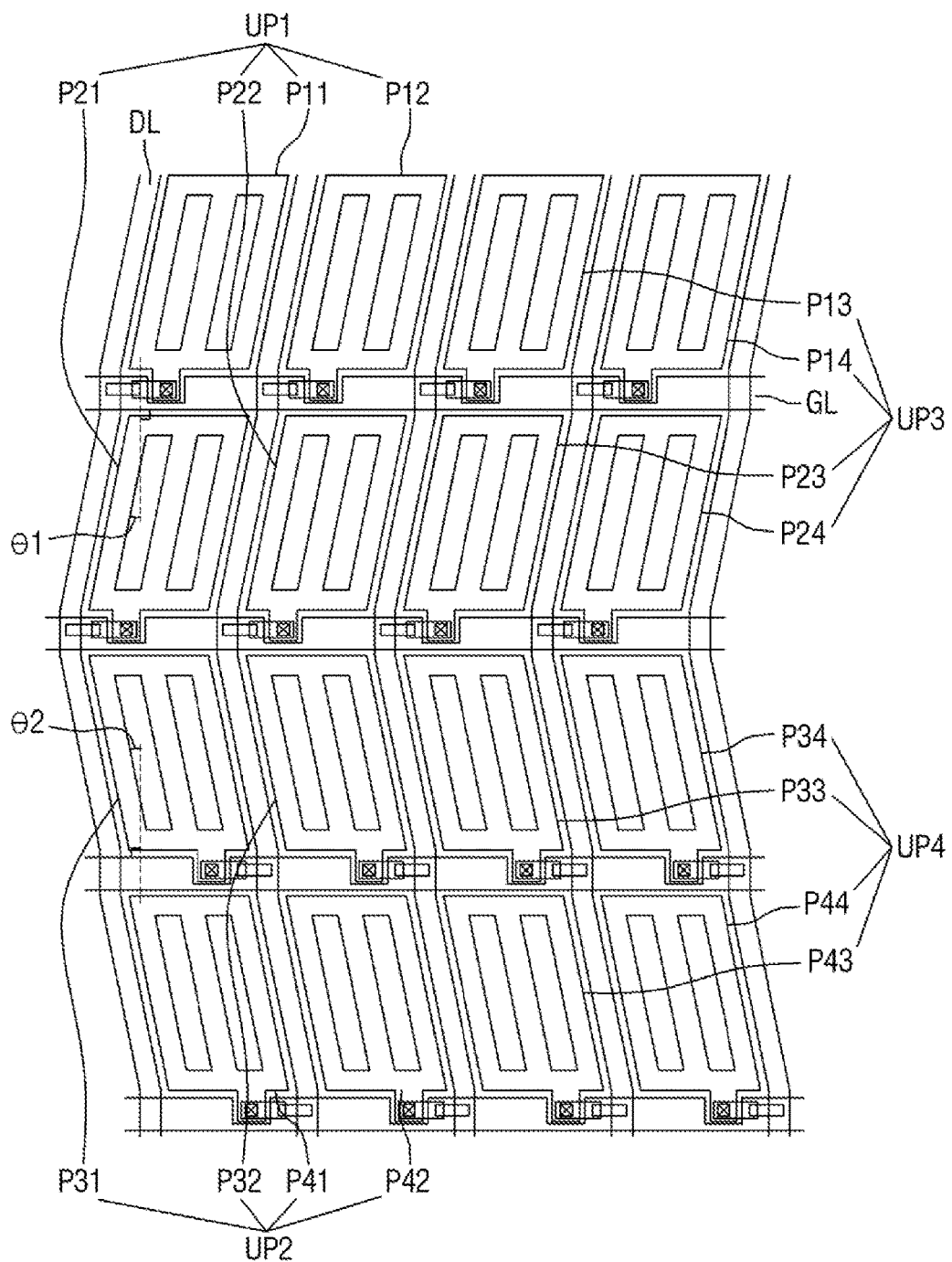
FIG. 14 is a plan view of a plurality of pixels according to another embodiment of the present invention.
Figure 15:
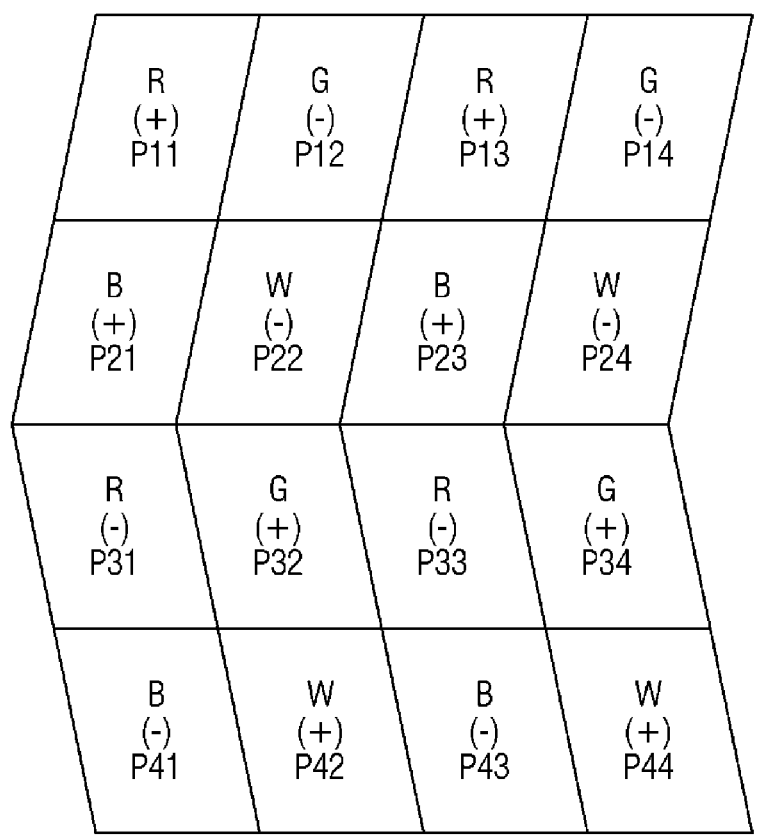
FIG. 15 is a schematic diagram illustrating the color display of pixels according to another embodiment of the present invention.

FIG. 14 is a plan view of a plurality of pixels according to another embodiment of the present invention. FIG. 15 is a schematic diagram illustrating the color display of pixels according to another embodiment of the present invention.

Detailed description is omitted for those elements of FIG. 14 that are identical to those of FIG. 4. In addition, detailed description is omitted for those elements of FIG. 15 that are identical to those of FIG. 6.

Referring to FIGS. 14 and 15, unlike in FIGS. 4 and 6, pixels P11 through P14 and P21 through P24 in the first and second rows may receive data signals from data lines DL disposed on a left side thereof, and pixels P31 through P34 and P41 through P44 in third and fourth rows may receive data signals from data lines DL disposed on a right side thereof.

This structure helps provide efficient polarity inversion.

More specifically, the LCD 1000 may use a polarity inversion method of periodically inverting the voltage of a signal transmitted to each pixel in order to prevent image crosstalk and flicker noise. Conventional column inversion is simple to perform but is not highly effective in preventing image crosstalk and flicker noise. On the other hand, conventional dot inversion is difficult to perform but is highly effective in preventing image crosstalk and flicker noise.

Here, if the connection structure to the data lines DL illustrated in FIG. 14 is used, the effect of dot inversion can be obtained by performing column inversion. Specifically, during display of a particular frame, a data signal having a positive polarity (+) may be provided to an $m^{th}$ data line DLm, a data signal having a negative polarity (−) may be provided to an $(m+1)^{th}$ data line DLm+1, a data signal having the positive polarity (+) may be provided to an $(m+2)^{th}$ data line DLm+2, a data signal having the negative polarity (−) may be provided to an $(m+3)^{th}$ data line DLm+3, and a data signal having the positive polarity (+) may be provided to an $(m+4)^{th}$ data line DLm+4.

Here, the positive polarity denotes a state in which a voltage provided to a pixel electrode PE of a corresponding pixel PX is relatively greater than a voltage provided to the common electrode CE. The negative polarity denotes a state in which a voltage provided to the pixel electrode PE of the corresponding pixel PX is relatively smaller than a voltage provided to the common electrode CE. That is, the positive polarity or the negative polarity does not necessarily mean a voltage greater or less than 0 V. Instead, the positive polarity or the negative polarity may be determined by a relative difference between voltages provided to the pixel electrode PE and the common electrode CE. In a frame, a data signal may be sequentially provided to each column of pixels. Since the pixels P11 through P14 and P21 through P24 in the first and second rows are connected to the data lines DL located on the left side thereof, a data signal having the positive polarity (+) may be provided to the first row first column pixel P1 and the second row first column pixel P21, a data signal having the negative polarity (−) may be provided to the first row second column pixel P12 and the second row second column pixel P22, a data signal having the positive polarity (+) may be provided to the first row third column pixel P13 and the second row third column pixel P23, and a data signal having the negative polarity (−) may be provided to the first row fourth column pixel P14 and the second row and fourth column pixel P24.

However, since the pixels P31 through P34 and P41 through P44 in the third and fourth rows are connected to the data lines DL disposed on the right side thereof, a data signal having the negative polarity (−) may be provided to the third row first column pixel P31 and the fourth row first column pixel P41, a data signal having the positive polarity (+) may be provided to the third row second column pixel P32 and the fourth row second column pixel P42, a data signal having the negative polarity (−) may be provided to the third row third column pixel P33 and the fourth row third column pixel P43, and a data signal having the positive polarity (+) may be provided to the third row fourth pixel P34 and the fourth row fourth column pixel P44.

That is, although a data signal having the positive polarity (+) and a data signal having the negative polarity (−) are transmitted to each data line DL, pixels in the display area DA may have the positive polarity (+) and the negative polarity (−) alternately along a column direction, and the positive polarity (+) and the negative polarity (−) may alternate every two pixels along a row direction. Therefore, the effect of dot inversion can largely be obtained.

In this case, since the first row first column pixel P11 and the third row first column pixel P31 are red pixels R and have differently-oriented domains, horizontal visibility can be improved. In addition, since data signals provided to the two pixels which display the same color have opposite polarities, flicker can be effectively reduced.

Figure 16:
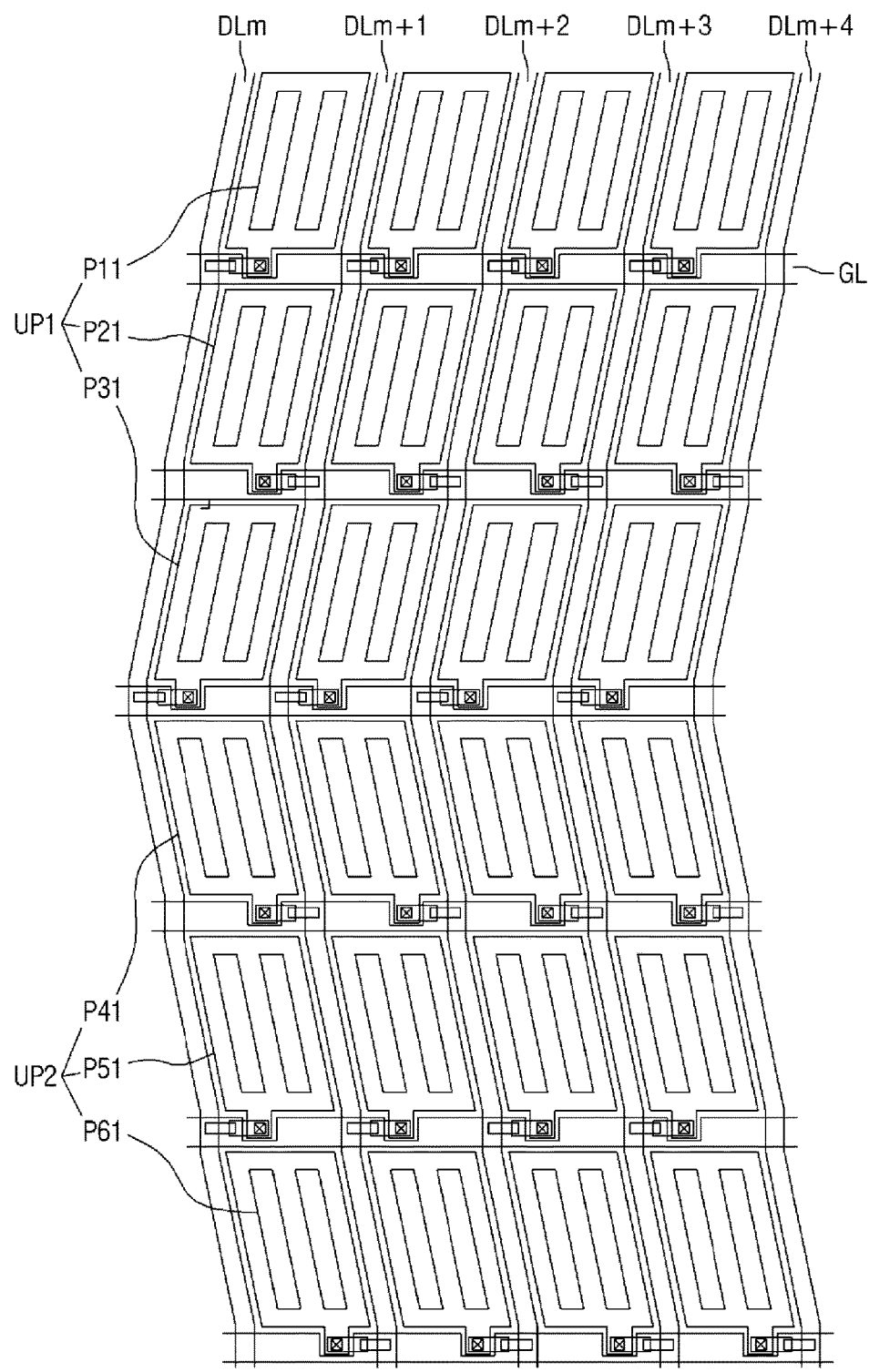
FIG. 16 is a plan view of a plurality of pixels according to another embodiment of the present invention.
Figure 17:
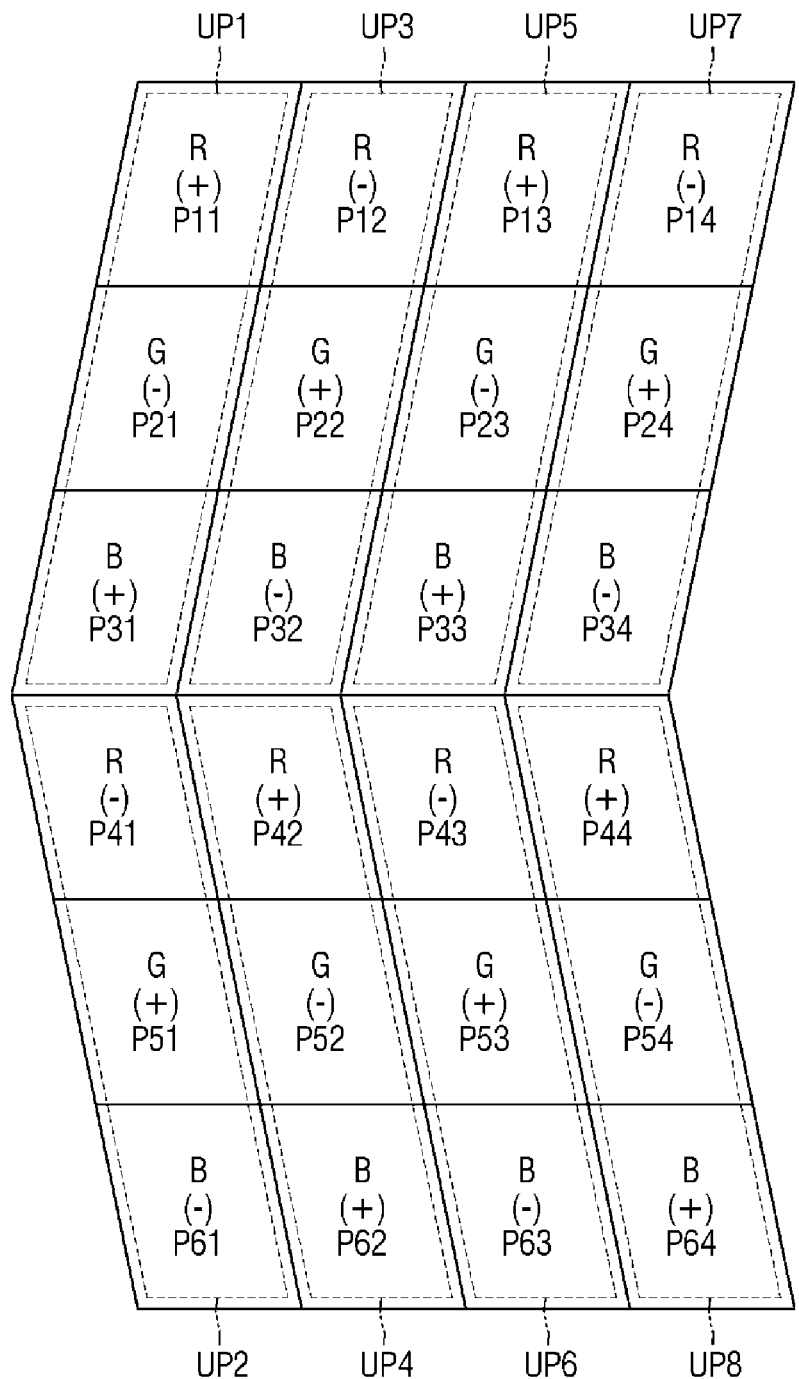
FIG. 17 is a schematic diagram illustrating the color display of pixels according to another embodiment of the present invention.

FIG. 16 is a plan view of a plurality of pixels according to another embodiment of the present invention. FIG. 17 is a schematic diagram illustrating the color display of pixels according to another embodiment of the present invention.

Detailed description is omitted for those elements of FIG. 16 that are identical to those of FIG. 10. In addition, detailed description is omitted for those elements of FIG. 17 that are identical to those of FIG. 11.

Referring to FIGS. 16 and 17, unlike in FIGS. 10 and 11, pixels P11 through P14, P31 through P34 and P51 through P54 in odd-numbered rows may receive data signals from data lines DL disposed on a left side thereof, and pixels P21 through P24, P41 through P44 and P61 through P64 in even-numbered rows may receive data signals from data lines DL disposed on a right side thereof.

This structure ensures efficient polarity inversion.

That is, if the connection structure to the data lines DL illustrated in FIG. 16 is used, the effect of dot inversion can be obtained by performing column inversion.

Specifically, in a frame at a certain time, a data signal having a positive polarity (+) may be provided to an $m^{th}$ data line DLm, a data signal having a negative polarity (−) may be provided to an $(m+1)^{th}$ data line DLm+1, a data signal having the positive polarity (+) may be provided to an $(m+2)^{th}$ data line DLm+2, a data signal having the negative polarity (−) may be provided to an $(m+3)^{th}$ data line DLm+3, and a data signal having the positive polarity (+) may be provided to an $(m+4)^{th}$ data line DLm+4.

At the same time, in the frame, a data signal may be sequentially provided to each row of pixels. A data signal having the positive polarity (+) may be provided to the pixels P11, P13, P31, P33, P51 and P53 in odd-numbered rows and odd-numbered columns, and to the pixels P22, P24, P42, P44, P62 and P64 in even-numbered rows and even-numbered columns. In addition, a data signal having the negative polarity (−) may be provided to the pixels P12, P14, P32, P34, P52 and P54 in odd-numbered rows and even-numbered columns, and to the pixels P21, P23, P41, P43, P61 and P63 in even-numbered rows and odd-numbered columns.

Therefore, each of a plurality of pixels which form first through eighth pixel groups UP1 through UP8 may receive a data signal having a different polarity from polarities of data signals provided to pixels adjacent thereto in horizontal and vertical directions. Accordingly, the effect of dot inversion can be obtained.

In addition, referring to the first and second pixel groups UP1 and UP2 which are adjacent to each other in a row direction, the pixel P11 in a first row of the first pixel group UP1 is a red pixel R and receives a data signal having the positive polarity (+), whereas the pixel P41 in a first row of the second pixel group UP2 is a red pixel R and receives a data signal having the negative polarity (−). That is, since the two pixels have differently-oriented domains, horizontal visibility can be improved. In addition, data signals provided to the two pixels which display the same color have opposite polarities, so that flicker can be effectively reduced while the horizontal visibility is effectively improved.

Figure 18:
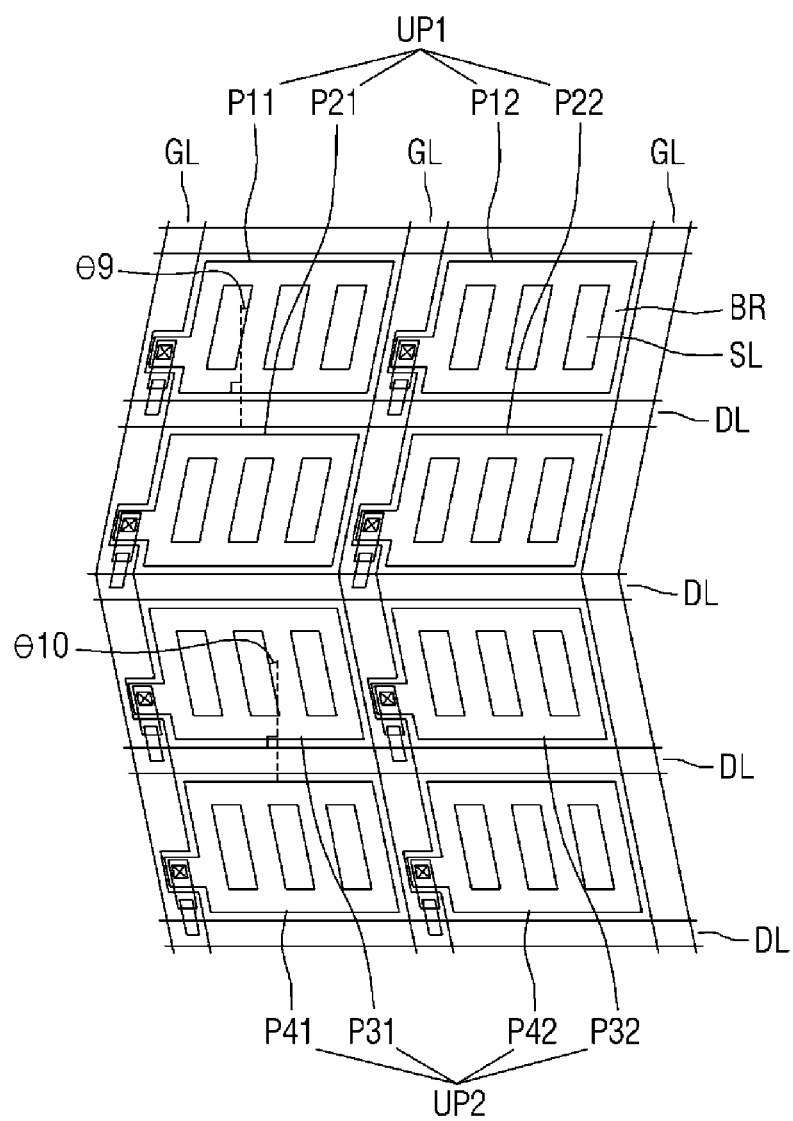
FIG. 18 is a plan view of a plurality of pixels according to another embodiment of the present invention.

FIG. 18 is a plan view of a plurality of pixels according to another embodiment of the present invention.

In FIG. 18, eight pixels in a region of a display area DA of an LCD 1000 according to another embodiment of the present invention are illustrated as an example.

Referring to FIG. 18, each of a plurality of pixels P11 through P42 according to the current embodiment forms one domain. In addition, two types of domain orientations are formed by the pixels P11 through P42. Each of the pixels P11 through P42 is disposed in a region surrounded by a data line DL extending substantially in a column direction and a gate line GL extending substantially in a row direction. In addition, a switching device Q which delivers a data signal provided to each data line DL to a pixel electrode PE may be disposed on a side of the pixel electrode PE.

In addition, branches BR and slits SL of the pixel electrode PE included in each of the pixels P11 through P42 may tilt to form a particular included angle in a clockwise direction with respect to a direction perpendicular to the data lines DL. The pixels P11 through P42 may include domains oriented at a ninth angle θ9 and domains oriented at a tenth angle θ10. Specifically, the pixels P11 through P42 shown in FIG. 18 may be defined as first row first column through fourth row second column pixels P11 through P42, respectively. In this case, each of the pixels P11, P12, P21 and P22 disposed in first and second rows may form the first domain, and each of the pixels P31, P32, P41 and P42 disposed in third and fourth rows may form the second domain.

Here, the pixel electrode PE included in each of the pixels P11, P12, P21 and P22 in the first and second rows may tilt in the clockwise direction at the ninth angle θ9 to the direction perpendicular to the data lines DL, thereby forming the first domain orientation. The pixel electrode PE included in each of the pixels P31, P32, P41 and P42 in the third and fourth rows may tilt in a counterclockwise direction at the tenth angle θ10 to the direction perpendicular to the data lines DL, thereby forming the second domain orientation. In addition, the ninth angle θ9 and the tenth angle θ10 may have the same absolute value such that the first domain and the second domain are symmetrically arranged about a data line DL.

Here, two different pixels disposed in non-successive rows may express the same color. Accordingly, this can improve the asymmetry of the horizontal viewing angle as described above with reference to FIG. 4.

That is, the gate lines GL and the data lines DL may extend in opposite directions from the directions in FIG. 4, and the asymmetry of the horizontal view angle and transmittance can be improved. Further, when the number of the data lines DL and the number of the gate lines GL are adjusted, the adjustment can be easily reflected in the design.

Figure 19:
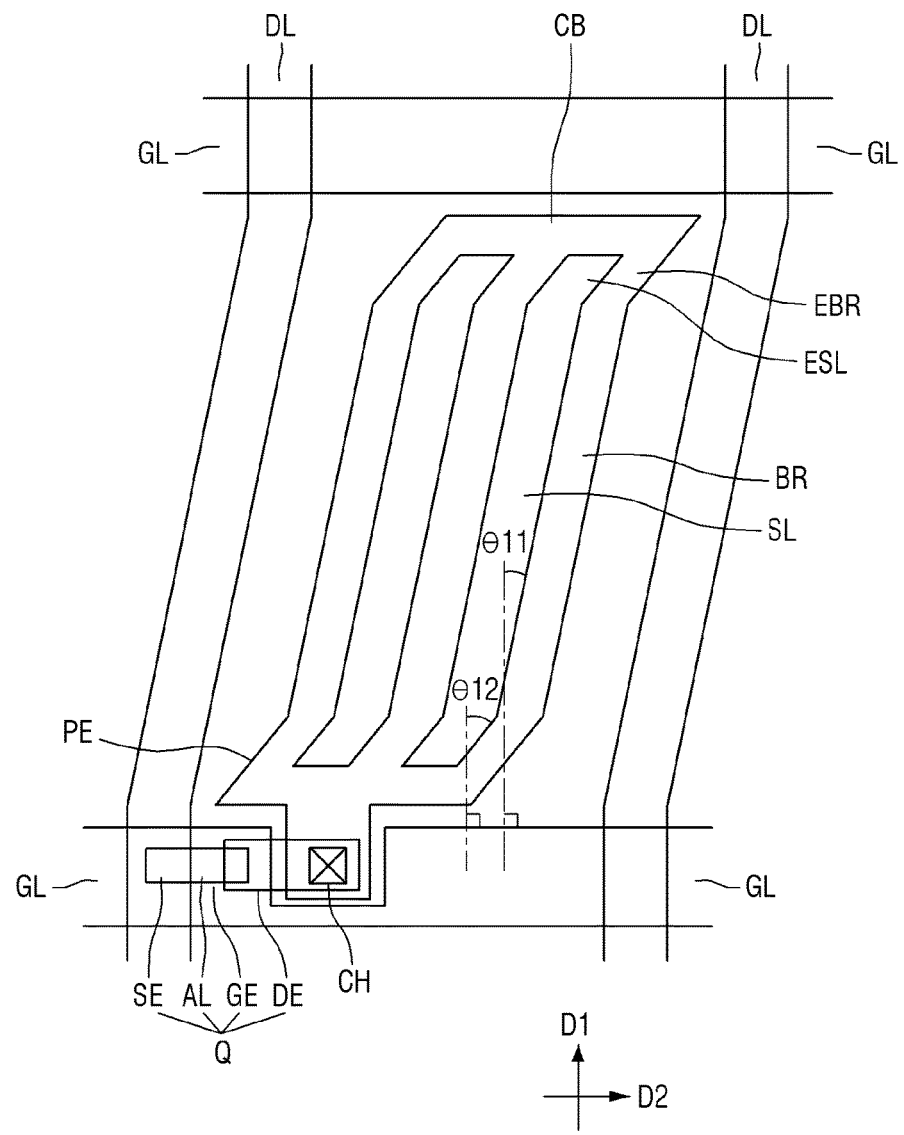
FIG. 19 is a plan view of a pixel according to an embodiment of the present invention.

FIG. 19 is a plan view of a pixel according to an embodiment of the present invention.

Detailed description is omitted for those elements of FIG. 19 that are identical to those of FIG. 2.

Referring to FIG. 19, unlike in FIG. 2, a pixel electrode PE may include a plurality of edge branches EBR and a plurality of edge slits ESL, which are disposed on both sides of a plurality of branches BR and a plurality of slits SL. The pixel electrode PE also includes a connecting bar CB that connects edge branches EBR to each other.

Here, the branches BR and the slits SL may tilt in a clockwise direction at an eleventh angle θ11 relative to a direction perpendicular to gate lines GL, and the edge branches EBR and the edge slits ESL may tilt in the clockwise direction at a twelfth angle θ12 relative to the direction perpendicular to the gate lines GL. In addition, the eleventh angle θ11 may be greater than the twelfth angle θ12.

The addition of the edge branches EBR and the edge slits ESL can increase the control over liquid crystal molecules disposed adjacent to the connecting bar CB of the pixel electrode PE, thereby increasing transmittance.

Lengths of the edge branches EBR and the edge slits ESL may be equal to or less than one third of lengths of the branches BR and the slits SL, respectively. In this case, an increase in transmittance in a region in which the connecting bar CB is disposed may be greater than an improvement in the horizontal visibility of an LCD 1000.

The pixel configuration illustrated in FIG. 19 is applicable to pixels included in any of the above-described embodiments.

According to embodiments of the present invention, an LCD having improved transmittance and visibility can be provided.

However, the effects of the present invention are not restricted to the one set forth herein. The above and other effects of the present invention will become more apparent to one of daily skill in the art to which the present invention pertains by referencing the claims. Various features of the above described and other embodiments can be mixed and matched in any manner, to produce further embodiments consistent with the invention.

What is claimed is:

1. A liquid crystal display (LCD) comprising:
an insulating substrate; and
a plurality of pixels disposed on the insulating substrate and comprising a first row of pixels, a second row of pixels, a third row of pixels, and a fourth row of pixels,
wherein the second row and the third row are positioned between the first row and the fourth row,
wherein the second row is positioned between the first row and the third row,
wherein no intervening row of pixels or subpixels is positioned between the first row and the second row, between the second row and the third row, or between the third row and the fourth row,
wherein each pixel in first and second rows has a first domain orientation and does not have a second domain orientation in a plan view of the LCD, wherein each pixel in third and fourth rows has the second domain orientation and does not have the first domain orientation in the plan view of the LCD, wherein the second domain orientation is different from the first domain orientation, wherein each pixel of the first row of pixels and the second row of pixels has a pixel edge which is parallel to the first domain orientation, and wherein each pixel of the third row of pixels and the forth row of pixels has a pixel edge which is parallel to the second domain orientation.

2. The LCD of claim 1, wherein the pixels in the first and third rows are configured to display the same color, the pixels in the second and fourth rows are configured to display the same color, and the pixels in the first and second rows are configured to display different colors.

3. The LCD of claim 1, wherein a distance between an upper end of pixel in the first row and a lower end of a pixel in the third row is 150 μm or less.

4. The LCD of claim 1:

wherein pixels in the first row include two red pixels each having the first domain and include two green pixels each having the first domain, and wherein pixels in the second row include two blue pixels each having the first domain and include two white pixels each having the first domain.

5. The LCD of claim 1, further comprising a plurality of gate lines and a plurality of data lines which are disposed on the insulating substrate to intersect each other, wherein the pixels in the first and fourth rows are in communication with different gate lines.

6. The LCD of claim 5:

wherein the gate lines extend in a first direction, and each of the pixels comprises a pixel electrode which is disposed on the insulating substrate and comprises a plurality of branches, wherein the pixel electrode of each pixel having the first domain orientation comprises a plurality of branches which tilt in a clockwise direction at a first angle with respect to a second direction perpendicular to the first direction, and wherein the pixel electrode of each pixel having the second domain orientation comprises a plurality of branches which tilt in a counterclockwise direction at a second angle with respect to the second direction.

7. The LCD of claim 6, wherein the first angle and the second angle have the same absolute value.

8. The LCD of claim 6, wherein a first section of each data line which is adjacent to the pixel electrode extends parallel to the branches of the pixel electrode, and a second section of each data line extends perpendicular to the first direction, wherein the first section is different from the second section.

9. The LCD of claim 6, wherein each data line extends parallel to the branches of the pixel electrode adjacent thereto.

10. The LCD of claim 6, further comprising a common electrode disposed on the insulating substrate and under the pixel electrode.

11. The LCD of claim 6, wherein the pixel electrode further comprises edge branches disposed between the branches and a connecting bar, wherein the edge branches tilt in the clockwise direction at a third angle with respect to the second direction, and an absolute value of the third angle is greater than those of the first and second angles.

12. The LCD of claim 1, wherein the pixels in the first and second rows are configured to receive data signals from an adjacent data line disposed on a side thereof, and the pixels in the third and fourth rows are configured to receive data signals from an adjacent data line disposed on another side thereof.

13. The LCD of claim 1, wherein pixels disposed in the same row have the same domain orientation.

* * * * *